US008751465B2

(12) United States Patent
Fukuoka

(10) Patent No.: US 8,751,465 B2
(45) Date of Patent: Jun. 10, 2014

(54) DOCUMENT MANAGEMENT APPARATUS, DOCUMENT MANAGEMENT SYSTEM, AND DOCUMENT MANAGEMENT METHOD

(75) Inventor: Fumihiro Fukuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 12/499,737

(22) Filed: Jul. 8, 2009

(65) Prior Publication Data

US 2010/0011032 A1 Jan. 14, 2010

(30) Foreign Application Priority Data

Jul. 11, 2008 (JP) ................................ 2008-182045

(51) Int. Cl.

*G06F 7/00* (2006.01)
*G06F 17/00* (2006.01)
*G06F 17/30* (2006.01)
*G06F 17/22* (2006.01)

(52) U.S. Cl.

CPC ...... *G06F 17/3023* (2013.01); *G06F 17/30011* (2013.01); *G06F 17/2288* (2013.01); *G06F 17/30067* (2013.01)
USPC .......................................... 707/695; 707/638

(58) Field of Classification Search

CPC .......... G06F 17/3023; G06F 17/30067; G06F 17/30011; G06F 17/2288
USPC ................................. 707/821, 822, 638, 695
See application file for complete search history.

(56) References Cited

U.S. PATENT DOCUMENTS

| | | | | |
|---|---|---|---|---|
| 6,510,439 B1 * | 1/2003 | Rangarajan et al. | .......... | 715/229 |
| 7,908,247 B2 * | 3/2011 | Ngo et al. | ..................... | 707/638 |
| 7,979,391 B2 * | 7/2011 | Watanabe et al. | ............. | 707/620 |
| 2006/0136511 A1 * | 6/2006 | Ngo et al. | ..................... | 707/203 |
| 2007/0067332 A1 * | 3/2007 | Gallagher et al. | ............ | 707/102 |
| 2009/0271450 A1 * | 10/2009 | Bush | ............................ | 707/203 |

FOREIGN PATENT DOCUMENTS

| | | | |
|---|---|---|---|
| CN | 101196896 | A | 6/2008 |
| JP | 2002-091813 | A | 3/2002 |
| JP | 2002-342137 | A | 11/2002 |
| JP | 2005-316715 | A | 11/2005 |

* cited by examiner

*Primary Examiner* — Apu Mofiz
*Assistant Examiner* — Jared Bibbee
(74) *Attorney, Agent, or Firm* — Canon USA, Inc. IP Division

(57) ABSTRACT

In an apparatus, a receiving unit receives a request for batch registration of versions associated with a document from a client terminal apparatus. A determination unit determines whether there is a file to be registered as a version of the document, based on the request. If there is the file to be registered as the version of the document, an extraction unit extracts final updater information from the file. A registration unit registers the file as the version of the document. A setting unit sets property information such that the extracted final updater information is set as the property information of the registered version.

20 Claims, 19 Drawing Sheets

| | | | |
|---|---|---|---|
| 📁 C:\Temp | | | |
| FILE   EDIT   DISPLAY   FAVORITE   TOOL   HELP | | | |
| NAME | DATE/TIME OF UPDATING | SIZE | DOCUMENT CREATOR |
| 📁 OLD | 09/01/2007 12:05 | | |
| 📄 REVIEW MATERIAL 0901.ppt | 09/01/2007 18:05 | 300 KB | yamada |
| 📄 REVIEW MATERIAL 0905.ppt | 09/05/2007 14:23 | 325 KB | suzuki |
| 📄 REVIEW MATERIAL 0906.ppt | 09/06/2007 20:44 | 358 KB | tanaka |
| 📄 REVIEW MATERIAL 0920.ppt | 09/20/2007 19:10 | 420 KB | tanaka |
| 📄 REVIEW MATERIAL 0921.ppt | 09/21/2007 18:35 | 539 KB | yamada |

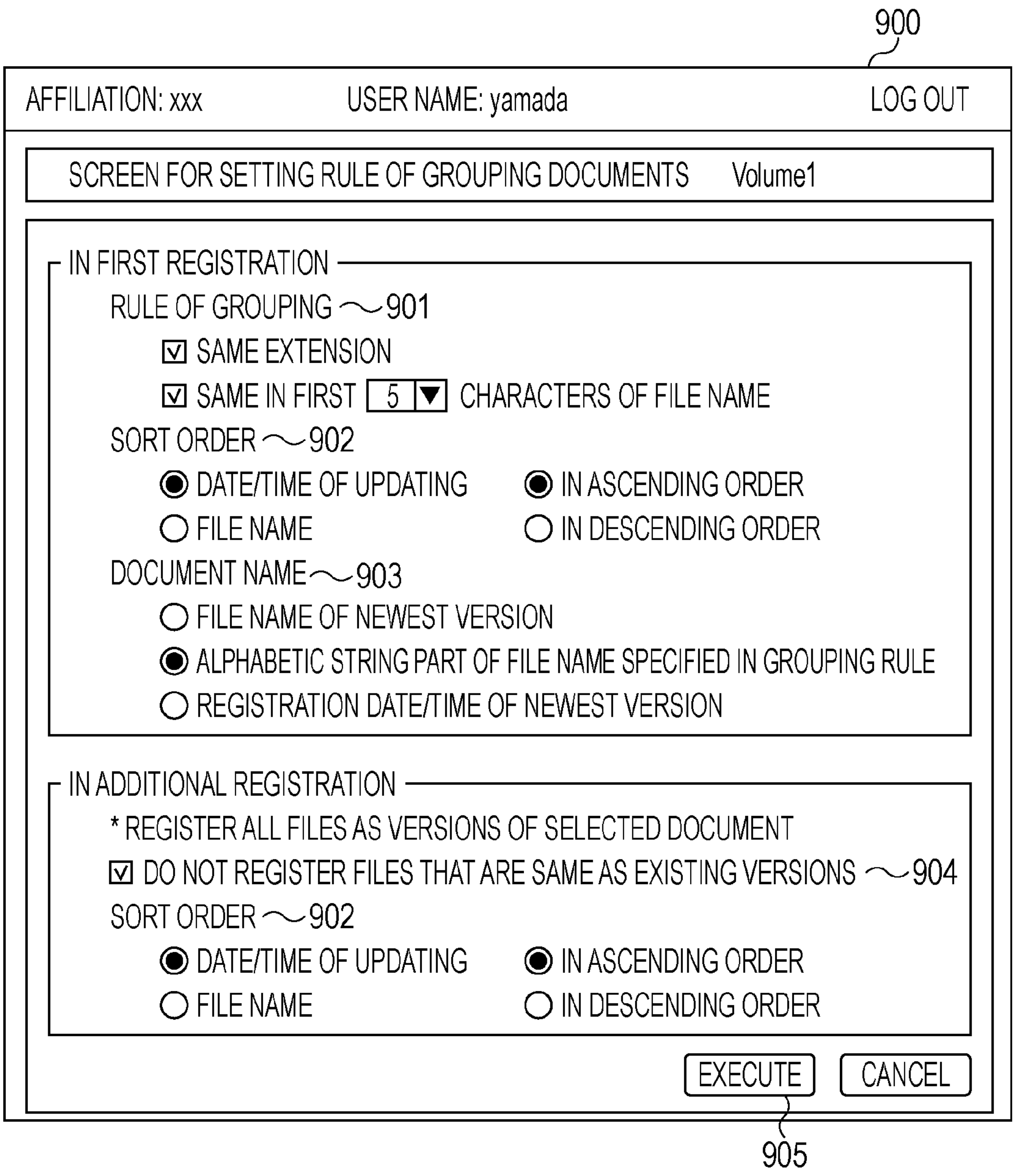

FIG. 9

```
                                                                    900
┌─────────────────────────────────────────────────────────────────────┐
│ AFFILIATION: xxx        USER NAME: yamada              LOG OUT      │
│                                                                     │
│  ┌───────────────────────────────────────────────────────────────┐  │
│  │ SCREEN FOR SETTING RULE OF GROUPING DOCUMENTS    Volume1      │  │
│  └───────────────────────────────────────────────────────────────┘  │
│  ┌─ IN FIRST REGISTRATION ──────────────────────────────────────┐   │
│  │     RULE OF GROUPING ～901                                    │   │
│  │        ☑ SAME EXTENSION                                       │   │
│  │        ☑ SAME IN FIRST [ 5 ▼] CHARACTERS OF FILE NAME         │   │
│  │     SORT ORDER ～902                                          │   │
│  │        ◉ DATE/TIME OF UPDATING     ◉ IN ASCENDING ORDER       │   │
│  │        ○ FILE NAME                 ○ IN DESCENDING ORDER      │   │
│  │     DOCUMENT NAME ～903                                       │   │
│  │        ○ FILE NAME OF NEWEST VERSION                          │   │
│  │        ◉ ALPHABETIC STRING PART OF FILE NAME SPECIFIED IN GROUPING RULE │
│  │        ○ REGISTRATION DATE/TIME OF NEWEST VERSION             │   │
│  └───────────────────────────────────────────────────────────────┘   │
│  ┌─ IN ADDITIONAL REGISTRATION ────────────────────────────────┐    │
│  │     * REGISTER ALL FILES AS VERSIONS OF SELECTED DOCUMENT    │    │
│  │     ☑ DO NOT REGISTER FILES THAT ARE SAME AS EXISTING VERSIONS ～904 │
│  │     SORT ORDER ～902                                         │    │
│  │        ◉ DATE/TIME OF UPDATING     ◉ IN ASCENDING ORDER      │    │
│  │        ○ FILE NAME                 ○ IN DESCENDING ORDER     │    │
│  └──────────────────────────────────────────────────────────────┘    │
│                                            [ EXECUTE ]  [ CANCEL ]  │
└─────────────────────────────────────────────────────────────────────┘
                                                  905
```

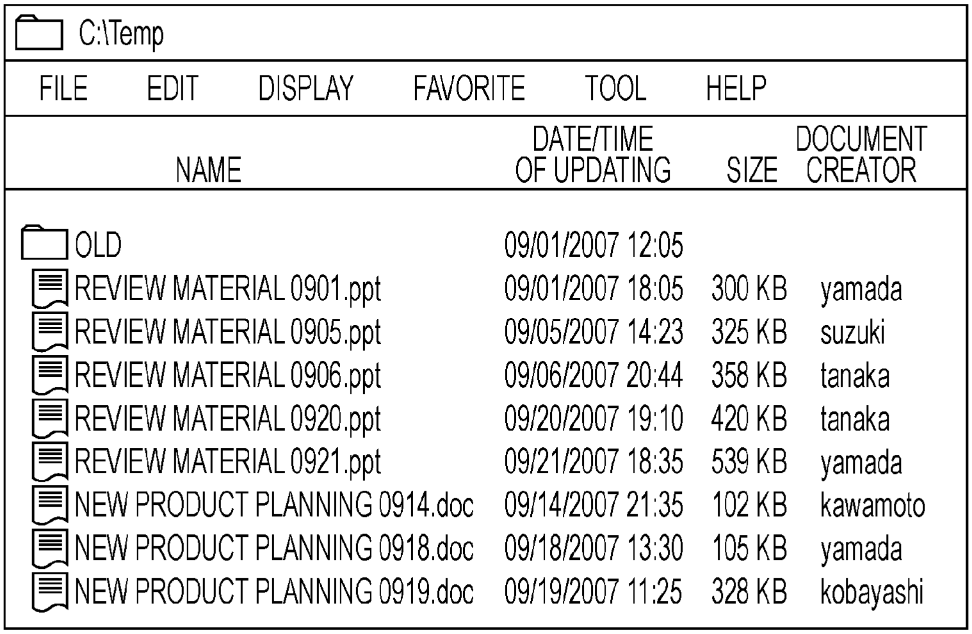

FIG. 10

| | C:\Temp | | | |
|---|---|---|---|---|
| FILE | EDIT  DISPLAY  FAVORITE | TOOL | HELP | |
| | NAME | DATE/TIME OF UPDATING | SIZE | DOCUMENT CREATOR |
| 📁 | OLD | 09/01/2007 12:05 | | |
| 📄 | REVIEW MATERIAL 0901.ppt | 09/01/2007 18:05 | 300 KB | yamada |
| 📄 | REVIEW MATERIAL 0905.ppt | 09/05/2007 14:23 | 325 KB | suzuki |
| 📄 | REVIEW MATERIAL 0906.ppt | 09/06/2007 20:44 | 358 KB | tanaka |
| 📄 | REVIEW MATERIAL 0920.ppt | 09/20/2007 19:10 | 420 KB | tanaka |
| 📄 | REVIEW MATERIAL 0921.ppt | 09/21/2007 18:35 | 539 KB | yamada |
| 📄 | NEW PRODUCT PLANNING 0914.doc | 09/14/2007 21:35 | 102 KB | kawamoto |
| 📄 | NEW PRODUCT PLANNING 0918.doc | 09/18/2007 13:30 | 105 KB | yamada |
| 📄 | NEW PRODUCT PLANNING 0919.doc | 09/19/2007 11:25 | 328 KB | kobayashi |

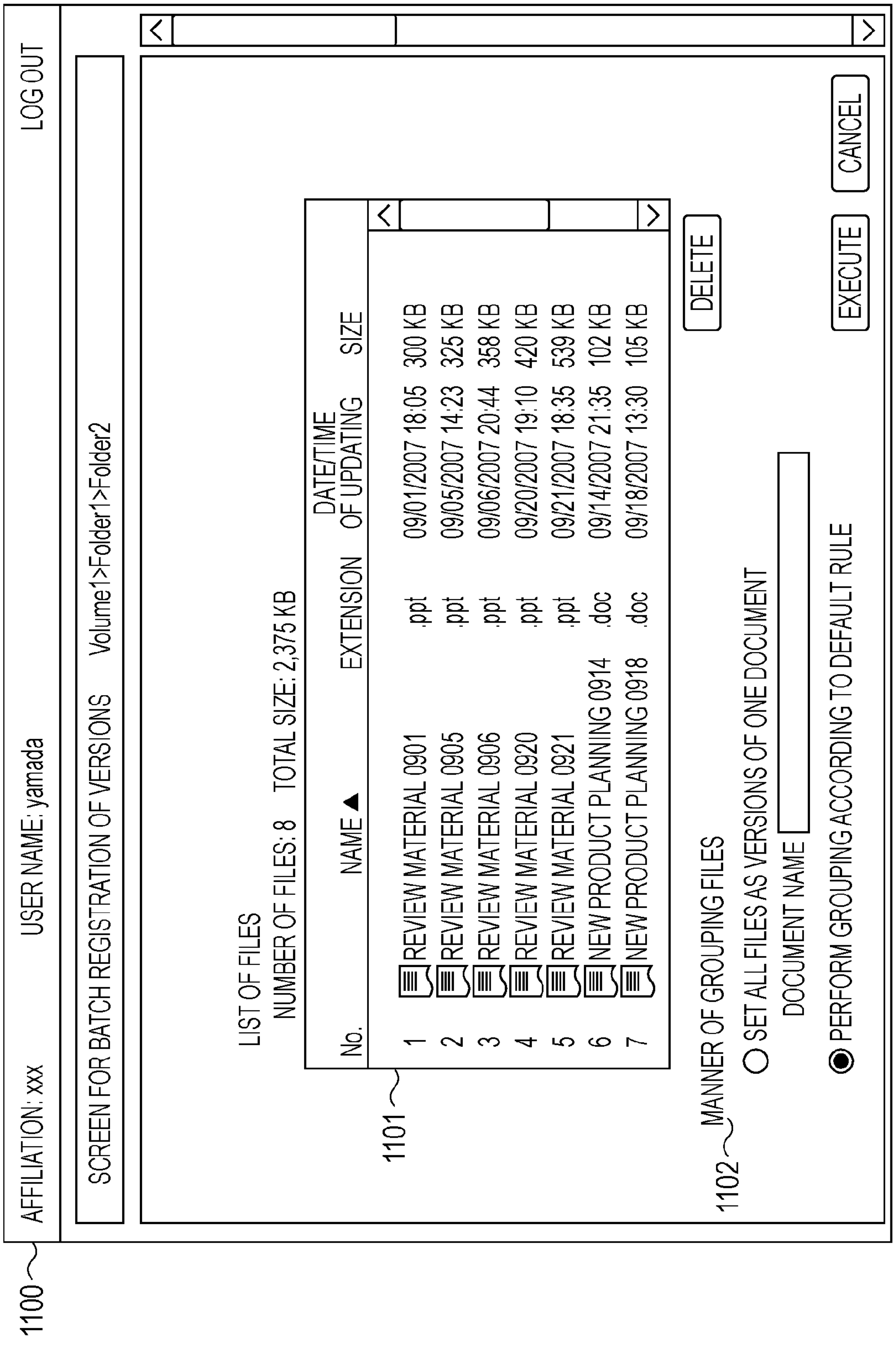

FIG. 11

AFFILIATION: xxx    USER NAME: yamada    LOG OUT

SCREEN FOR BATCH REGISTRATION OF VERSIONS    Volume1>Folder1>Folder2

LIST OF FILES
NUMBER OF FILES: 8    TOTAL SIZE: 2,375 KB

| No. | NAME ▲ | EXTENSION | DATE/TIME OF UPDATING | SIZE |
|---|---|---|---|---|
| 1 | REVIEW MATERIAL 0901 | .ppt | 09/01/2007 18:05 | 300 KB |
| 2 | REVIEW MATERIAL 0905 | .ppt | 09/05/2007 14:23 | 325 KB |
| 3 | REVIEW MATERIAL 0906 | .ppt | 09/06/2007 20:44 | 358 KB |
| 4 | REVIEW MATERIAL 0920 | .ppt | 09/20/2007 19:10 | 420 KB |
| 5 | REVIEW MATERIAL 0921 | .ppt | 09/21/2007 18:35 | 539 KB |
| 6 | NEW PRODUCT PLANNING 0914 | .doc | 09/14/2007 21:35 | 102 KB |
| 7 | NEW PRODUCT PLANNING 0918 | .doc | 09/18/2007 13:30 | 105 KB |

[DELETE]

MANNER OF GROUPING FILES
○ SET ALL FILES AS VERSIONS OF ONE DOCUMENT
  DOCUMENT NAME [       ]
● PERFORM GROUPING ACCORDING TO DEFAULT RULE

[EXECUTE]  [CANCEL]

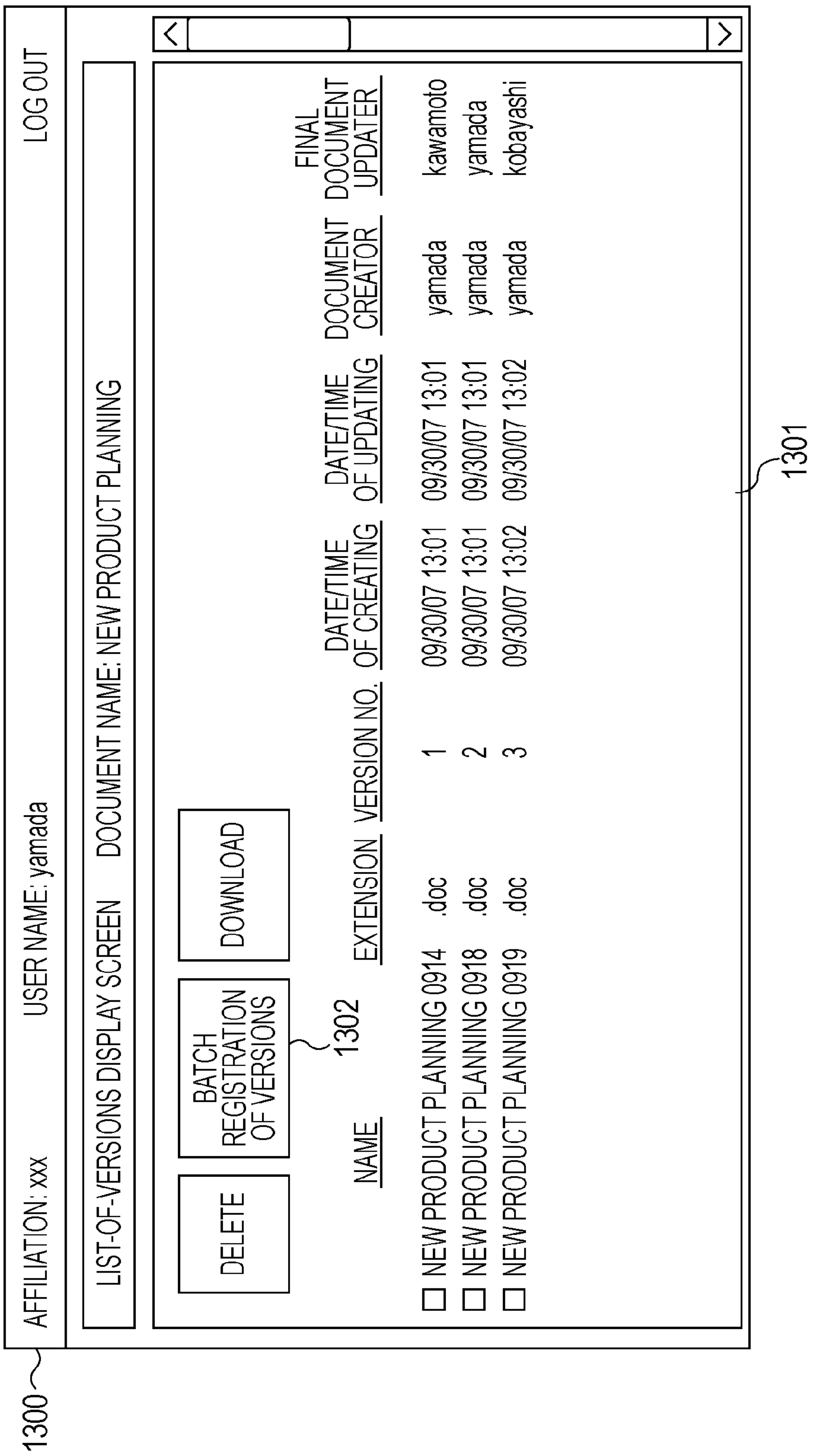

FIG. 13

| | AFFILIATION: xxx | USER NAME: yamada | | | | LOG OUT |
|---|---|---|---|---|---|---|
| | LIST-OF-VERSIONS DISPLAY SCREEN | DOCUMENT NAME: NEW PRODUCT PLANNING | | | | |

| DELETE | BATCH REGISTRATION OF VERSIONS | DOWNLOAD | | | | |
|---|---|---|---|---|---|---|
| | NAME | EXTENSION | VERSION NO. | DATE/TIME OF CREATING | DATE/TIME OF UPDATING | DOCUMENT CREATOR | FINAL DOCUMENT UPDATER |
| ☐ | NEW PRODUCT PLANNING 0914 | .doc | 1 | 09/30/07 13:01 | 09/30/07 13:01 | yamada | kawamoto |
| ☐ | NEW PRODUCT PLANNING 0918 | .doc | 2 | 09/30/07 13:01 | 09/30/07 13:01 | yamada | yamada |
| ☐ | NEW PRODUCT PLANNING 0919 | .doc | 3 | 09/30/07 13:02 | 09/30/07 13:02 | yamada | kobayashi |

1300
1301
1302

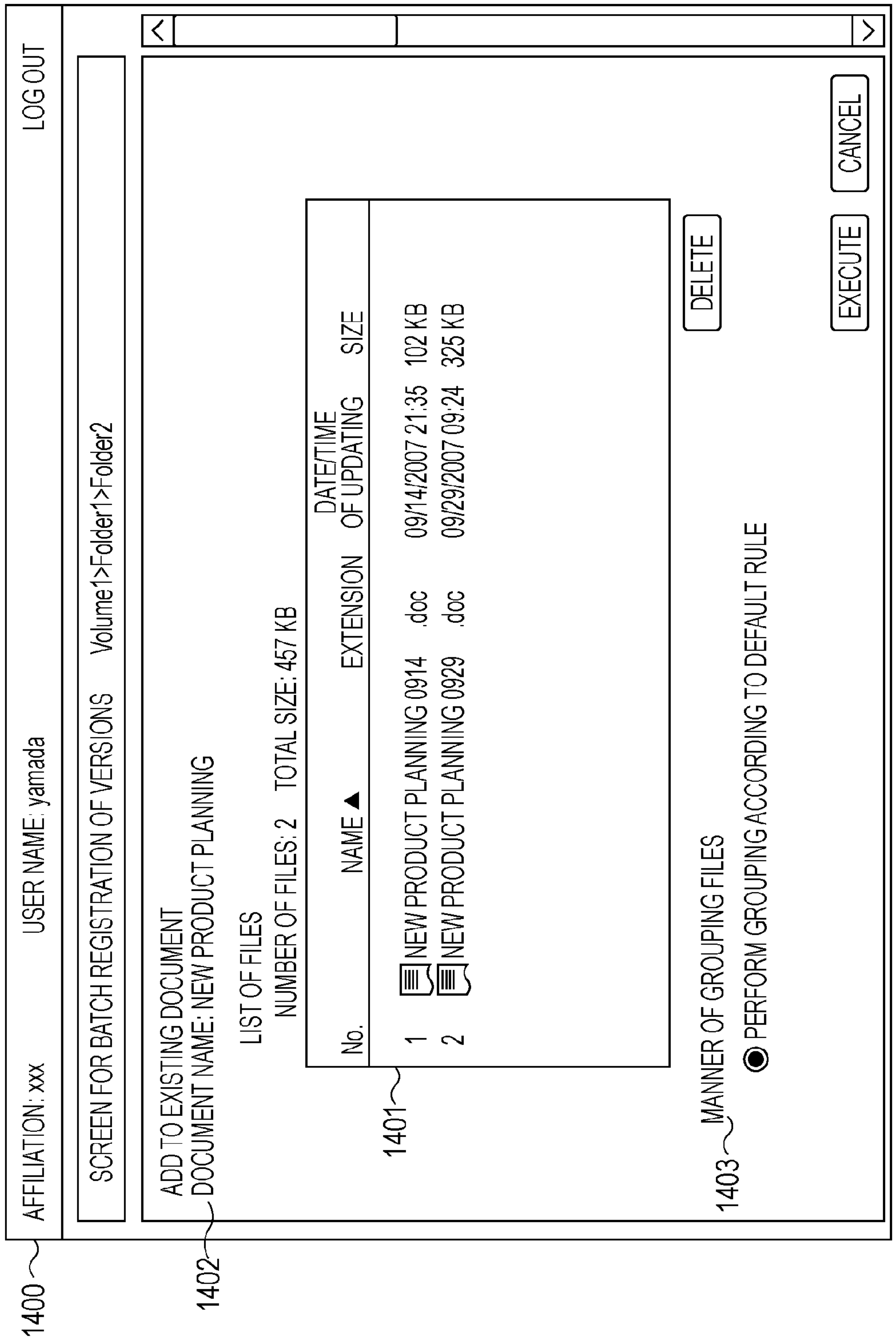

FIG. 14

| AFFILIATION: xxx | USER NAME: yamada | | LOG OUT |

SCREEN FOR BATCH REGISTRATION OF VERSIONS    Volume1>Folder1>Folder2

ADD TO EXISTING DOCUMENT
DOCUMENT NAME: NEW PRODUCT PLANNING

LIST OF FILES
NUMBER OF FILES: 2   TOTAL SIZE: 457 KB

| No. | NAME ▲ | EXTENSION | DATE/TIME OF UPDATING | SIZE |
|---|---|---|---|---|
| 1 | NEW PRODUCT PLANNING 0914 | .doc | 09/14/2007 21:35 | 102 KB |
| 2 | NEW PRODUCT PLANNING 0929 | .doc | 09/29/2007 09:24 | 325 KB |

DELETE

MANNER OF GROUPING FILES
● PERFORM GROUPING ACCORDING TO DEFAULT RULE

EXECUTE    CANCEL

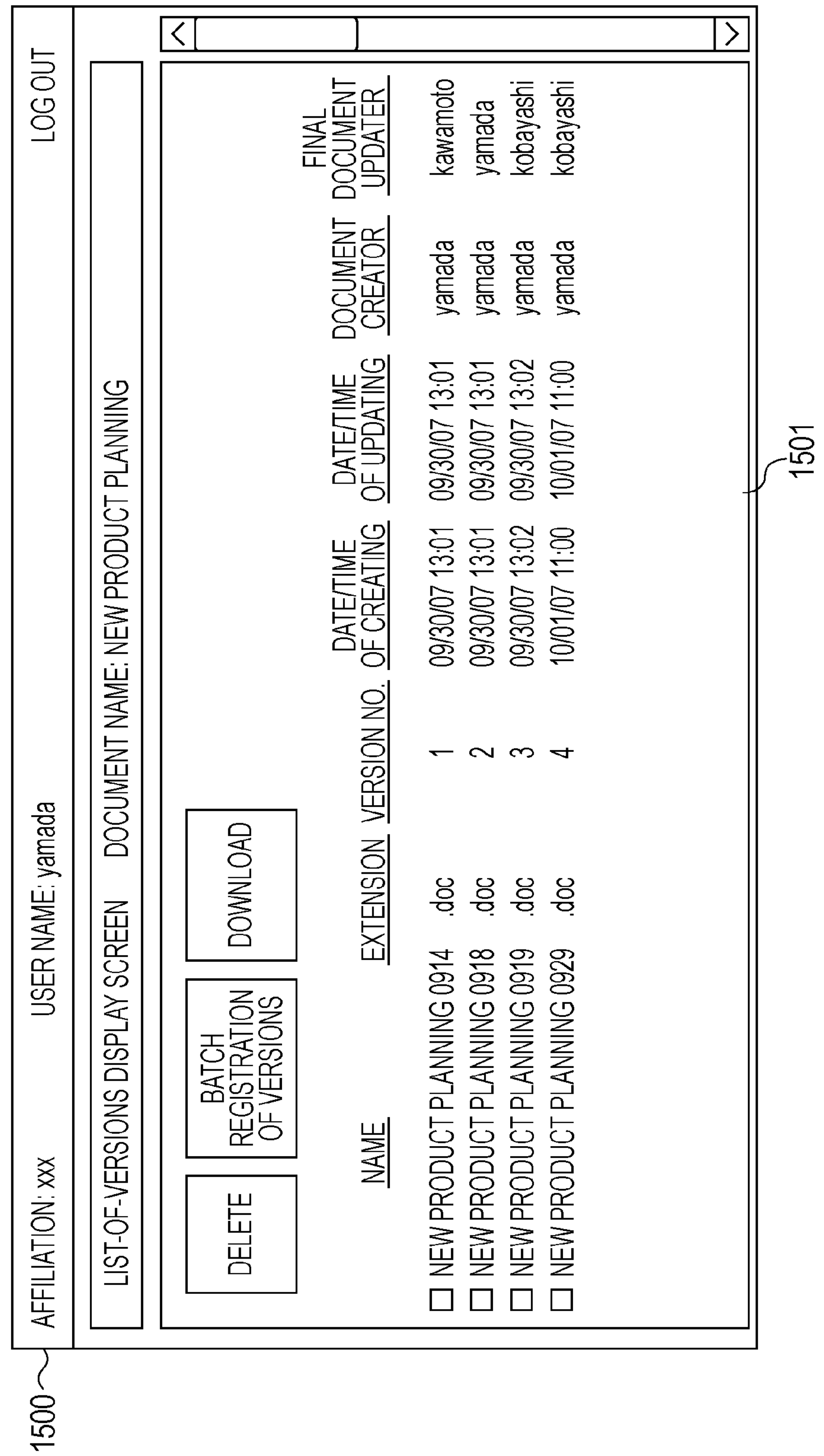

FIG. 15

AFFILIATION: xxx    USER NAME: yamada    LOG OUT

LIST-OF-VERSIONS DISPLAY SCREEN    DOCUMENT NAME: NEW PRODUCT PLANNING

| | DELETE | BATCH REGISTRATION OF VERSIONS | DOWNLOAD | | | | | |
|---|---|---|---|---|---|---|---|---|
| | NAME | | EXTENSION | VERSION NO. | DATE/TIME OF CREATING | DATE/TIME OF UPDATING | DOCUMENT CREATOR | FINAL DOCUMENT UPDATER |
| ☐ | NEW PRODUCT PLANNING 0914 | | .doc | 1 | 09/30/07 13:01 | 09/30/07 13:01 | yamada | kawamoto |
| ☐ | NEW PRODUCT PLANNING 0918 | | .doc | 2 | 09/30/07 13:01 | 09/30/07 13:01 | yamada | yamada |
| ☐ | NEW PRODUCT PLANNING 0919 | | .doc | 3 | 09/30/07 13:02 | 09/30/07 13:02 | yamada | kobayashi |
| ☐ | NEW PRODUCT PLANNING 0929 | | .doc | 4 | 10/01/07 11:00 | 10/01/07 11:00 | yamada | kobayashi |

| FIG. 16A |
|---|
| FIG. 16B |

FIG. 17

| DATA NAME | EXAMPLE OF DATA |
|---|---|
| DOCUMENT IDENTIFIER | D1111111 |
| DOCUMENT NAME | REVIEW MATERIAL |
| EXTENSION OF NEWEST VERSION | .ppt |
| NUMBER OF VERSIONS | 5 |
| NEWEST VERSION NUMBER | 5 |
| SIZE OF NEWEST VERSION | 551036 |
| TOTAL SIZE OF VERSIONS | 1988608 |
| IDENTIFIER INDICATING TARGET FOLDER | F1111110 |
| DATE/TIME OF CREATING | 9/30/2007 13:02 |
| DATE/TIME OF UPDATING | 9/30/2007 13:02 |
| DOCUMENT CREATOR | yamada |

FIG. 18

| DATA NAME | EXAMPLE OF DATA | EXAMPLE OF DATA | EXAMPLE OF DATA |
|---|---|---|---|
| DOCUMENT IDENTIFIER | D1111111 | D1111111 | D1111111 |
| VERSION IDENTIFIER | V0000001 | V0000002 | V0000003 |
| VERSION NO | 1 | 2 | 3 |
| FILE NAME | REVIEW MATERIAL 0901 | REVIEW MATERIAL 0905 | REVIEW MATERIAL 0906 |
| EXTENSION | .ppt | .ppt | .ppt |
| SIZE | 307200 | 332800 | 332800 |
| DATE/TIME OF CREATING | 9/30/2007 13:01 | 9/30/2007 13:01 | 9/30/2007 13:02 |
| DATE/TIME OF UPDATING | 9/30/2007 13:01 | 9/30/2007 13:01 | 9/30/2007 13:02 |
| DOCUMENT CREATOR | yamada | yamada | yamada |
| FINAL DOCUMENT UPDATER | yamada | suzuki | tanaka |
| HASH VELUE | A098379BC0F76833<br>877EA093387BA333 | 09BCAF9837789CC1<br>019899BBC0EA1275 | 11CDBF983E332101<br>028BE8766CD1A1F0 |

DOCUMENT MANAGEMENT APPARATUS, DOCUMENT MANAGEMENT SYSTEM, AND DOCUMENT MANAGEMENT METHOD

BACKGROUND OF THE INVENTION

1. Field of the Invention

The present invention relates to a document management apparatus, a document management system, and a document management method.

2. Description of the Related Art

In file systems of Windows, Linux, or the like, files are managed such that one version is assigned to one file. In such a file system, when one file is edited by a plurality of users in collaboration, it is common to divide the original file into a plurality of files and assign different file names to the respective files so that versions can be managed by file names. Some document management systems have a capability of managing a plurality of versions for one file (document). In such a document management system, first, a user declares to start editing by checking out a registered document, and checking in the document when the editing is ended. In this document management system, versions are managed such that when a user performs check-out and check-in for a document, a new version is additionally registered for this document. Such a document management system usually provides also a function of viewing a version history and downloading old versions.

To transfer data from a file system in which versions are managed by file names to a document management system having the version management capability described above, a user first registers a file of an oldest version and then performs check-out and check-in repeatedly as many times as there are files. To avoid such a troublesome operation, a technique has been proposed. In a technique disclosed in Japanese Patent Laid-Open No. 2005-316715, monitoring is performed to detect an occurrence of copying of a file from a file system which does not have the version management capability to a file system having the version management capability. After such copying is detected, each time a file is updated, the updated file is automatically registered as a new version.

However, in the technique disclosed in Japanese Patent Laid-Open No. 2005-316715, it is not allowed to register a plurality of files as a batch via a single operation. In this technique, information is not managed about users who updated respective files, and thus it is impossible to know, on the document management system, which document was updated by which user.

SUMMARY OF THE INVENTION

According to a one aspect of the present invention, there is provided an apparatus including a receiving unit configured to receive a request for batch registration of versions associated with a document from a client terminal, a determination unit configured to determine whether there is a file to be registered as a version of the document, based on the request, an extraction unit configured to, if there is the file to be registered as the version of the document, extract final updater information from the file, a registration unit configured to register the file as the version of the document, and a setting unit configured to set property information such that the extracted final updater information is set as the property information of the registered version registered by the registration unit.

According to another aspect of the present invention, there is provided a system including a client terminal apparatus and an apparatus, the client terminal apparatus including a production unit configured to produce a request for batch registration of versions associated with a document, and a transmitting unit configured to transmit the request to the apparatus, the apparatus including a receiving unit configured to receive the request, a determination unit configured to determine whether there is a file to be registered as a version of the document, based on the request, an extraction unit configured to, if there is the file to be registered as the version of the document, extract final updater information from the file, a registration unit configured to register the file as the version of the document, and a setting unit configured to set property information such that the extracted final updater information is set as the property information of the registered version.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram illustrating an example of a grouping/assigning rule setting screen for defining a rule of grouping/assigning of documents.

FIG. 10 is a diagram illustrating an example of a screen on which a list of files stored in a file storage unit of a personal computer is displayed.

FIG. 11 is a diagram illustrating an example of a screen for batch registration of versions.

FIG. 13 is a diagram illustrating an example of a version list displaying screen.

FIG. 14 is a diagram illustrating an example of a screen for batch registration of versions.

FIG. 15 is a diagram illustrating an example of a version list displaying screen in which displayed is a result of a batch registration of versions for an existing document performed in response to clicking on an EXECUTE button in FIG. 14 by a user.

FIG. 16 is a flow chart illustrating an example of a process performed by a document management system in response to a command to execute a batch registration of versions issued by a user via FIG. 6, FIG. 11, FIG. 14, or the like.

FIG. 17 is a diagram illustrating examples of document property data and version property data.

FIG. 18 is a diagram illustrating examples of document property data and version property data.

DESCRIPTION OF THE EMBODIMENTS

Various embodiments of the present invention will now be described in detail in accordance with the accompanying drawings.

Figure 1:
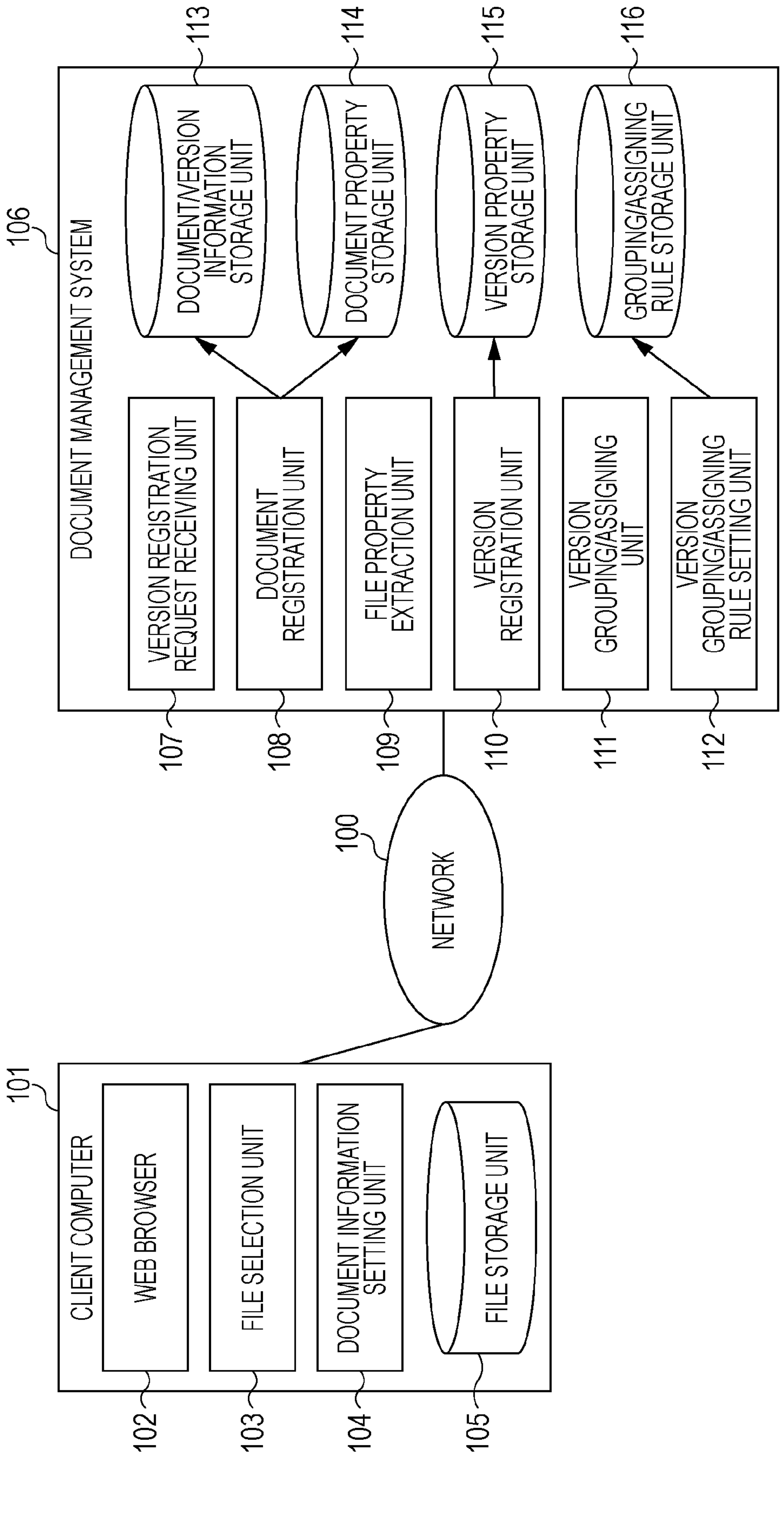
FIG. 1 is a diagram schematically illustrating an example of a configuration of a document management system and a client computer.

FIG. 1 is a diagram schematically illustrating an example of a configuration of a document management system and a client computer. As shown in FIG. 1, the client computer 101 and the document management system 106 are connected to each other via a network 100 such as the Internet or an intracorporate LAN (Local Area Network) so that the client computer 101 and the document management system 106 are allowed to communicate with each other.

In FIG. 1, reference numeral 101 denotes a client computer such as a personal computer (hereinafter referred to as a PC) used by a user. Note that the client computer is an example of a client terminal apparatus. A Web browser 102 is of a common type for accessing a Web server. A file selection unit 103 is a module configured to operate on the Web browser 102 to select an arbitrary file from a file storage unit 105. The file selection unit 103 may be a plug-in module installed on the PC 101 separately from the Web browser 102. A document information setting unit 104 is a module configured to operate on the Web browser 102 to make setting in terms of documents names, a registration order of one or more files selected by the file selection unit 103, etc. The document information setting unit 104 may be a plug-in module installed on the PC 101 separately from the Web browser 102. Note that in the present embodiment it is assumed by way of example that the Web browser and plug-in modules are used. However, in the present invention, there is no particular restriction on the configuration as long as a client application is capable of transmitting files and information associated with the files. The file storage unit 105 may be a storage device disposed in the PC 101 or may be a storage device disposed on a file server connected via the network 100.

The document management system 106 taken in the explanation as an example of the document management apparatus includes one or more information processing apparatuses and includes a plurality of processing units and information storage units. The document management system 106 is capable of managing cabinets, folders, documents, and versions in a hierarchical manner although a further detailed explanation thereof is omitted. In the following description of the present embodiment, it is assumed that in the document management system 106, there are already registered cabinets, folders, documents, and user information indicating users allowed to access the cabinets, folders, and documents. Reference numerals 107 (i.e., version registration request receiving unit), 108 (i.e., document registration unit), 109 (i.e., file property extraction unit), 110 (i.e., version registration unit), 111 (i.e., version grouping/assigning unit), and 112 (i.e., version grouping/assigning rule setting unit) denote processing units configured to perform processing in accordance with a request issued by the PC 101. Reference numerals 113 (i.e., document/version information storage unit), 114 (i.e., document property storage unit), 115 (i.e., version property storage unit), and 116 (group/assigning rule storage unit) denote information storage units used by the processing units to write/read information.

Figure 2:
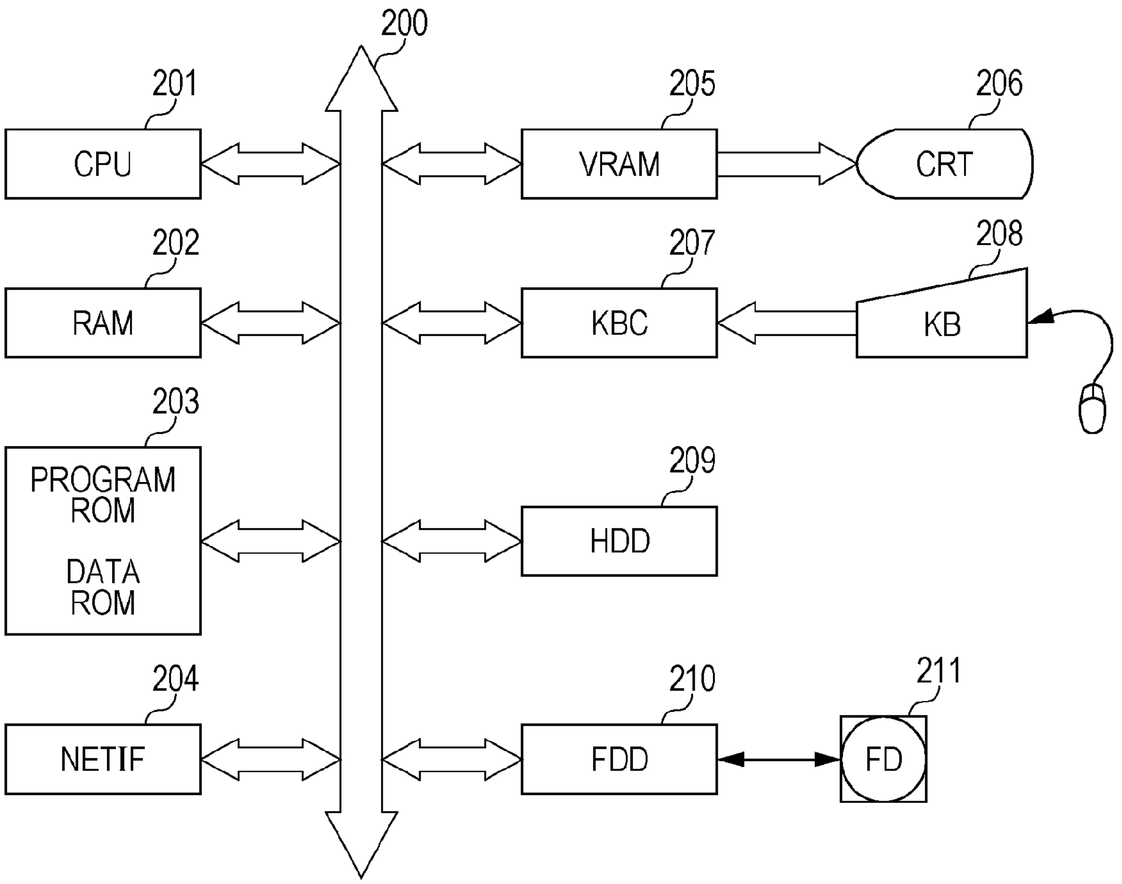
FIG. 2 is a block diagram illustrating an example of a hardware configuration of a computer usable as a document management system or a client computer.

FIG. 2 is a block diagram illustrating an example of a hardware configuration of a computer used as a document management system or a client computer. Reference numeral 201 denotes a central processing unit (CPU) configured to perform calculation and control the operation of the information processing apparatus. Reference numeral 202 denotes a random access memory (RAM) used by the CPU 201 as a main memory area, an execution program storage area, a program executing area, and a data area.

Reference numeral 203 denotes a read only memory (ROM) in which a program associated with an operation procedure performed by the CPU 201 or the like and other data are stored. The ROM 203 includes a program ROM and a data ROM. In the program ROM, basic software (OS) serving as a system program for controlling the information processing apparatus is stored. In the data ROM, information for the operation of the system is stored. Instead of the ROM 203, an HDD 209 described below may be used.

Reference numeral 204 denotes a network interface (NETIF) configured to control transferring of data between information processing apparatuses via a network and have a diagnostic connection test capability. Reference numeral 205 denotes a video RAM (VRAM) configured to store and control data of an image to be displayed on a screen of a CRT 206 to indicate an operation status of the information processing apparatus.

Reference numeral 206 denotes a display such as a cathode ray tube (CRT). Hereinafter, by way of example, it is assumed that a CRT is used as the display 206. Reference numeral 207 denotes a controller configured to control an input signal from an external input device 208 such as a keyboard or a pointing device such as a mouse operated by a user to input the signal. Hereinafter, by way of example, a keyboard (KB) is used as the external input device 208, and a keyboard controller (KBC) is used as the controller 207.

Reference numeral 209 denotes a hard disk drive (HDD) for storing application programs and various kinds of data. In the present embodiment, the application programs are software programs to realize respective processing units according to the present embodiment.

Reference numeral 210 denotes an external input/output device for inputting/outputting data from/to a removable storage medium. In particular, the external input/output device 210 is used to read an application program from a removable storage medium. Reference numeral 211 denotes a removable storage medium from/to which the external input/output device reads data. Examples of the removable storage medium 211 include a magnetic storage medium such as a flexible disk, an optical storage medium (such as a CD-ROM disk), a magneto-optical storage medium (such as an MO disk), a semiconductor storage medium (such as a memory card), etc. In the following explanation, by way of example, it is assumed that a flexible disk is used as the removable storage medium 211 and a flexible disk drive is used as the external input/output device 210. Thus, hereinafter, the external input/output device 210 is also referred to as the flexible disk drive (FDD) 210, and the removable storage medium 211 is also referred to as the flexible disk (FD) 211.

Note that the application program and/or the data may be stored on the FDD 210 instead of the HDD 209.

Figure 3:
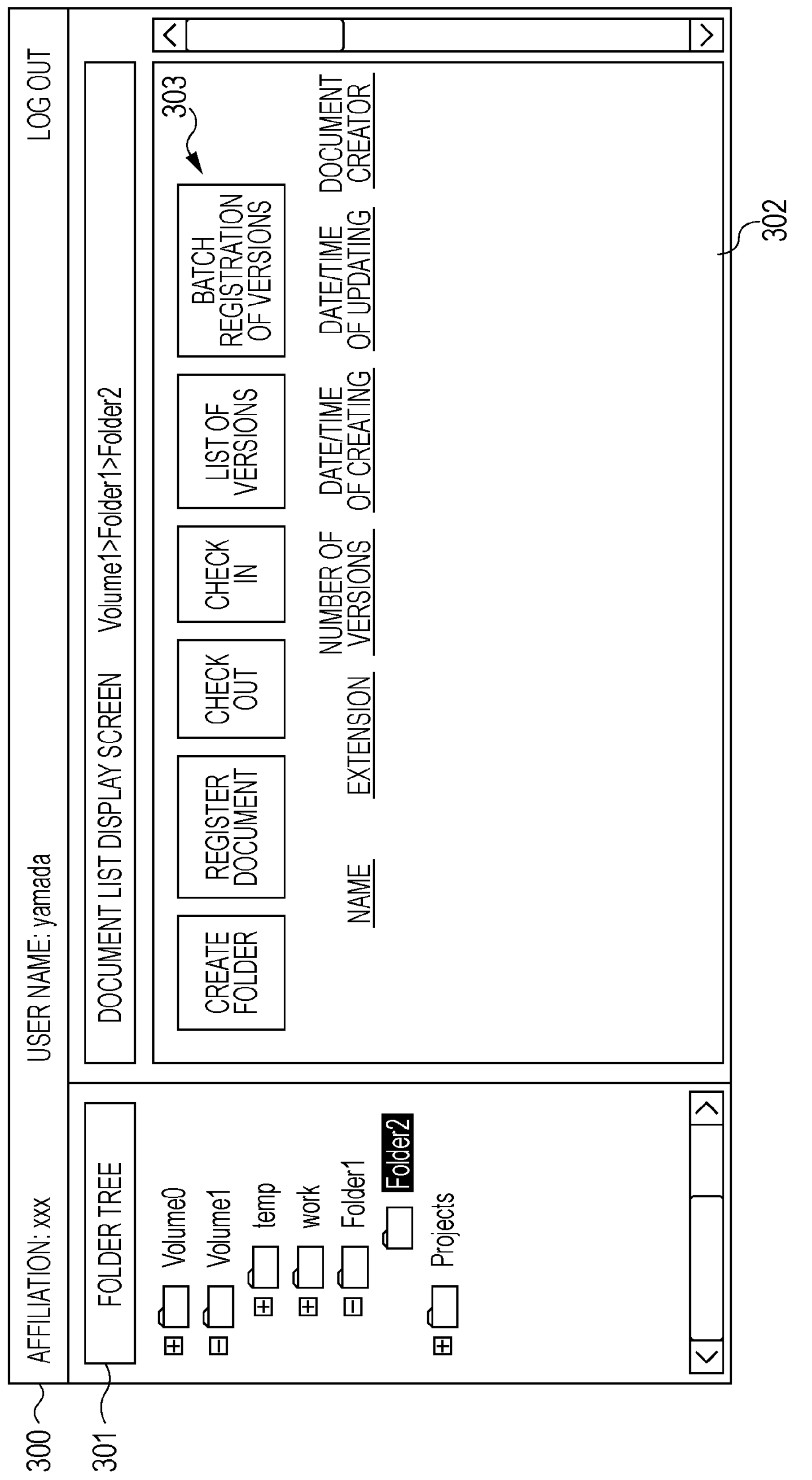
FIG. 3 is a diagram illustrating an example of a main document management screen.

FIG. 3 illustrates an example of a main document management screen, denoted by reference numeral 300, which is displayed when a user accesses and logs on the document management system via the Web browser 102 on the PC 101.

A folder tree displaying area 301 is a screen area in which folders managed in a hierarchical manner by the document management system 106 are displayed. If a symbol + or a symbol – in this folder tree displaying area 301 is clicked by a user, the PC 101 opens or closes a clicked folder. If a folder is selected by a user, the PC 101 displays sub folders or a list of documents in the selected folder in a document list displaying area 302.

The document list displaying area 302 is a screen area in which information in a selected folder is displayed in the form of a list. This screen area is mainly used by the user during operation to specify a process to be performed on folders or documents. Examples of commands include a sub folder creation command, a document registration command, a check out command, a check in command, a delete command, a download command, etc. If one of these commands is issued by a user by clicking a corresponding one of buttons 303 (e.g., create folder button), the PC 101 or the document management system 106 executes a process according to the command.

Figure 4:
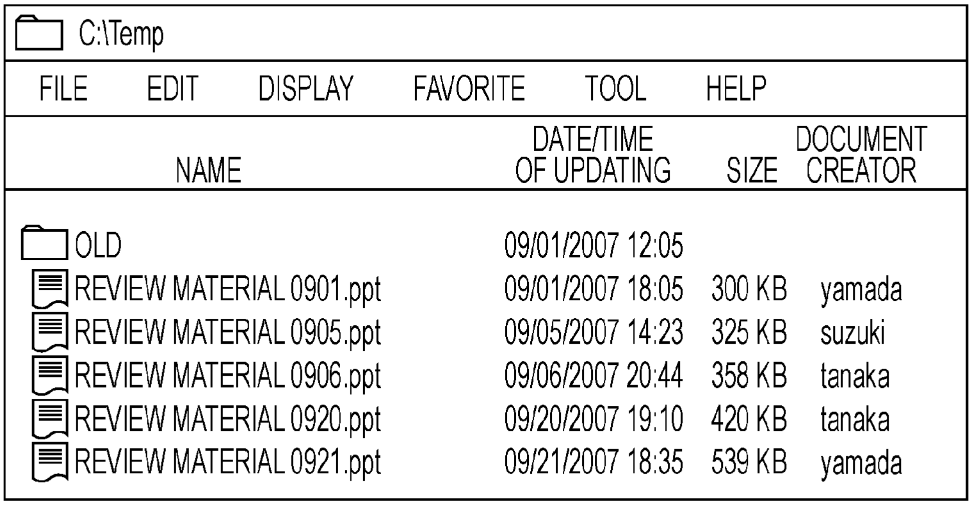
FIG. 4 is a diagram illustrating an example of a list of files stored in a file storage unit of a personal computer.

FIG. 4 illustrates an example of a list of files stored in the file storage unit 105 of the PC 101. In the following explanation, by way of example, it is assumed that there are five files with file names starting with "Review Material" shown in FIG. 4.

Figure 5:
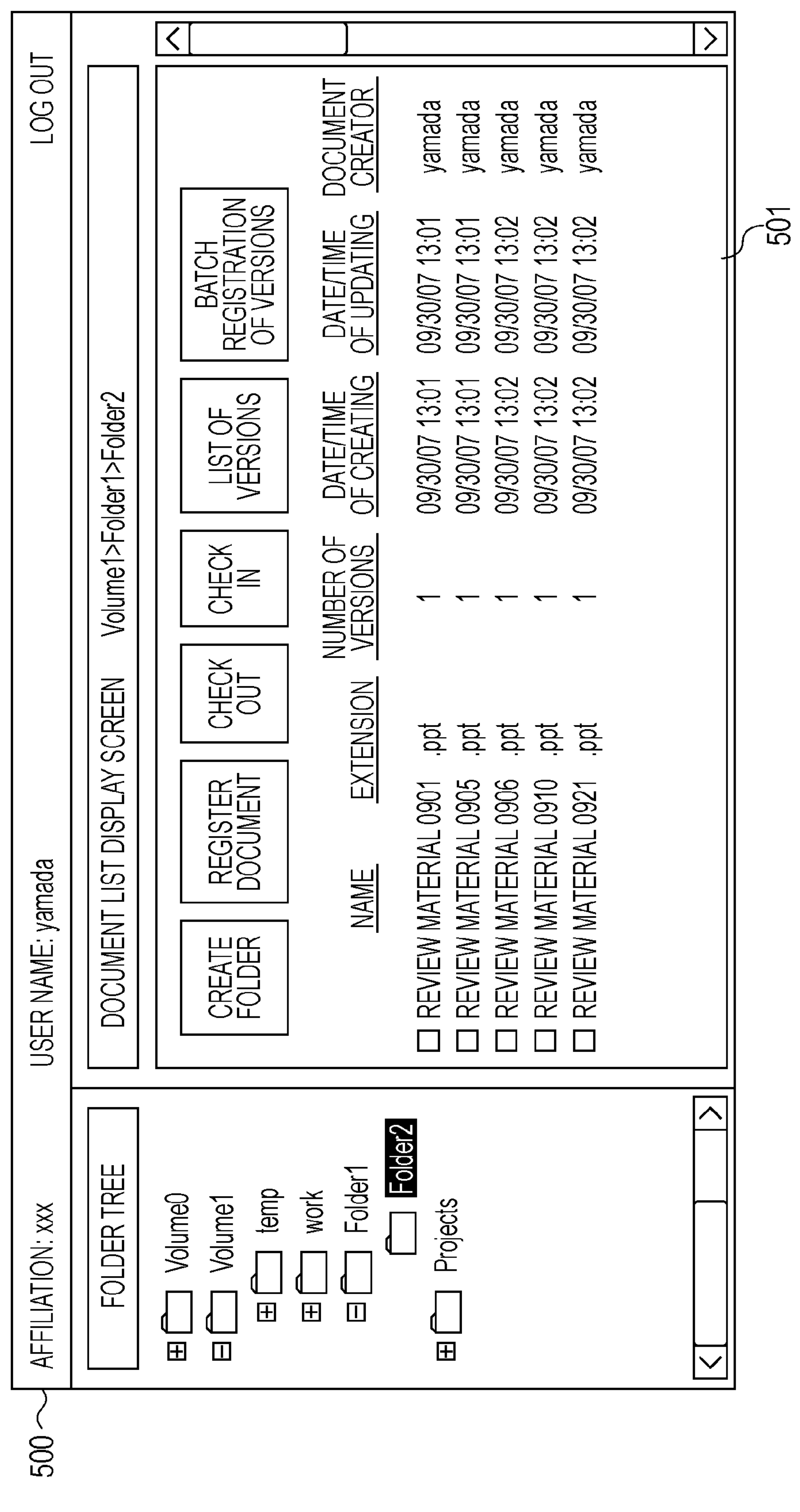
FIG. 5 is a diagram illustrating an example of a screen in a state in which in response to clicking on a document registration button on a document list displaying area, files shown in FIG. 4 are registered by a personal computer.

FIG. 5 illustrates an example of a screen 500 in a state in which in response to clicking on a Register Document button in the document list displaying area 302, the five files shown in FIG. 5 have been registered by the PC 101. In this state, the five files are registered as separate documents as shown in a document list displaying area 501 of FIG. 5. A user name of a user, yamada, who has issued the document registration command, is registered as a document creator. This state corresponds to a state in which files are stored in a file system of a PC that does not have the version management capability.

Figure 6:
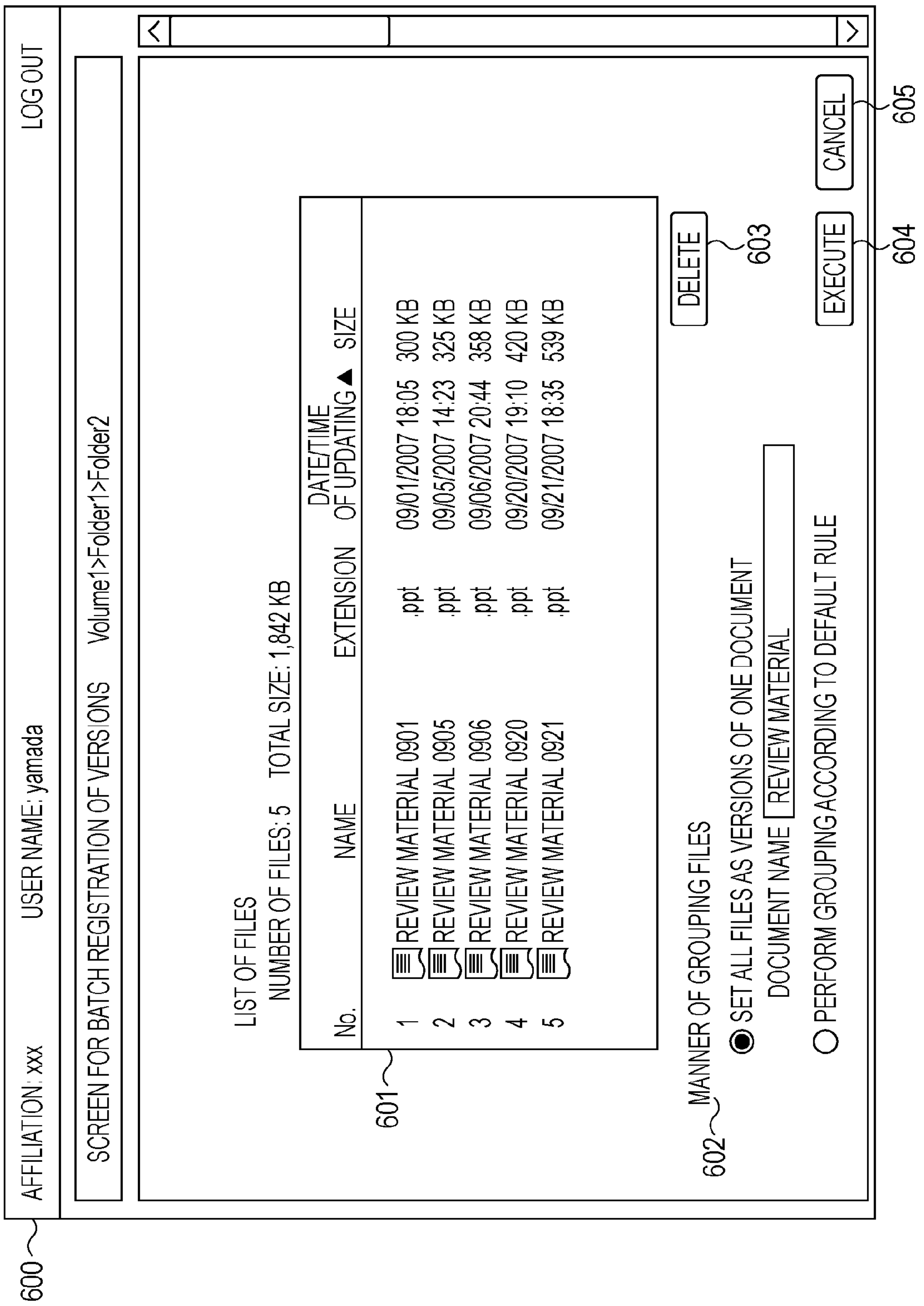
FIG. 6 is a diagram illustrating an example of a screen for batch registration of versions.

FIG. 6 illustrates an example of a screen 600 for batch registration of versions. Reference numeral 601 denotes a files-to-be-registered list area in which a list of files to be registered is displayed. If a user drags and drops a file stored in the PC 101 into the files-to-be-registered list area 601, the file is added to the list. In the files-to-be-registered list area 601, a file name, an extension, a date/time of updating, and a size are displayed for each file. The files in the list may be sorted according to a selected item or may be fixed to an order determined according to the date/time of updating or the file name. The order in which the files are displayed in the files-to-be-registered list area 601 is reflected in determination of the order of versions.

Reference numeral 602 denotes a file grouping/assigning method specifying unit that allows a user to specify whether the files in the files-to-be-registered list area 601 are to be registered as versions of a single document or to be grouped into different documents according to a predetermined rule. The predetermined rule may be set in such a manner as will be described later. Depending on the rule, the document management system 106 may group a plurality of files into a plurality of documents having a plurality of versions. In the case where the command issued by a user indicates that all files are to be grouped into a single document, a document name is input by the user. In the example shown in FIG. 6, the command issued by the user indicates that all files are to be grouped into a single document, and "Review Material" is specified as the document name.

Reference numeral 603 denotes a DELETE button used to delete a selected file from the files-to-be-registered list area. If one or more files in the files-to-be-registered list area is selected by a user and the DELETE button is clicked, the selected one or more files are deleted from the group of files to be registered.

Reference numeral 604 denotes an EXECUTE button. If this button is clicked by a user, the PC 101 produces a request for batch registration of versions and transmits it to the document management system 106. The request for batch registration of versions includes a file list including information indicating properties of files (property information) and a file order (file order information), a grouping/assigning method, a specified document name, and entities of all files (all actual files). In the case where it is specified by a user via the grouping/assigning method specifying part 602 that grouping/assigning is to be performed according to the predetermined rule, the document name and the file order are not included in the request for batch registration of versions.

Reference numeral 605 denotes a CANCEL button. If this button is clicked by a user, the PC 101 cancels a request for batch registration of versions.

Figure 7:
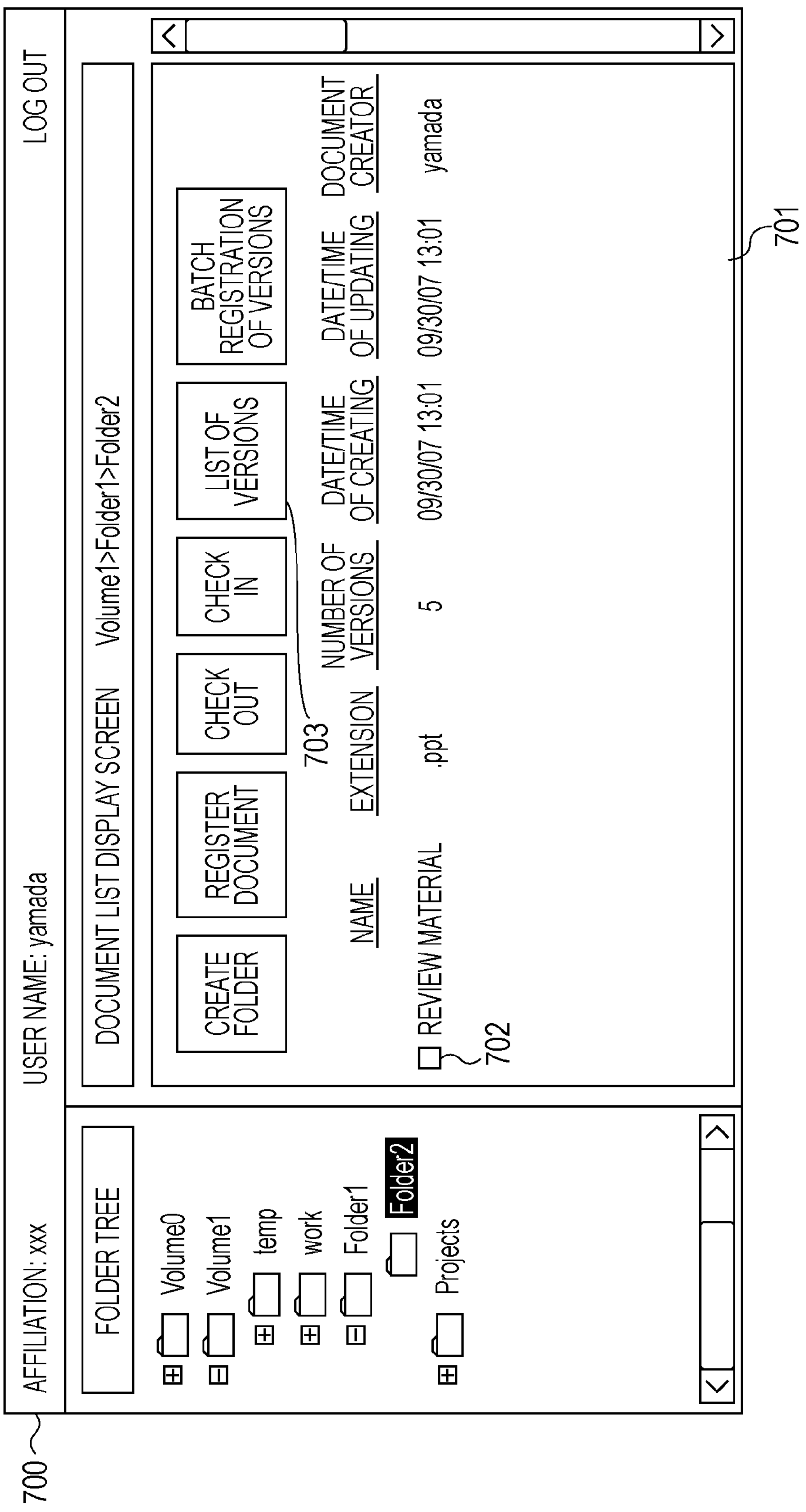
FIG. 7 is a diagram illustrating an example of a document list displaying screen in which displayed is a result of batch registration performed in response to clicking on an EXECUTE button in FIG. 6 by a user.

FIG. 7 illustrates an example of a document list displaying screen 700 in which displayed is a result of batch registration of versions performed in response to clicking on the EXECUTE button 604 shown in FIG. 6 by a user. In this example, it is specified by the user via the grouping/assigning method specifying part 602 that all files are to be grouped into a single document, and thus only one document is displayed in the document list displaying area 701. In this case, five files are grouped into the single document, and thus the document has five versions as indicated in a column "Number of Versions". In FIG. 7, if a user selects a document by checking a document selection box 702 (i.e., Review Material) and further clicks a List of Versions display button 703, then a version list displaying screen 800 such as that shown in FIG. 8 is displayed.

Figure 8:
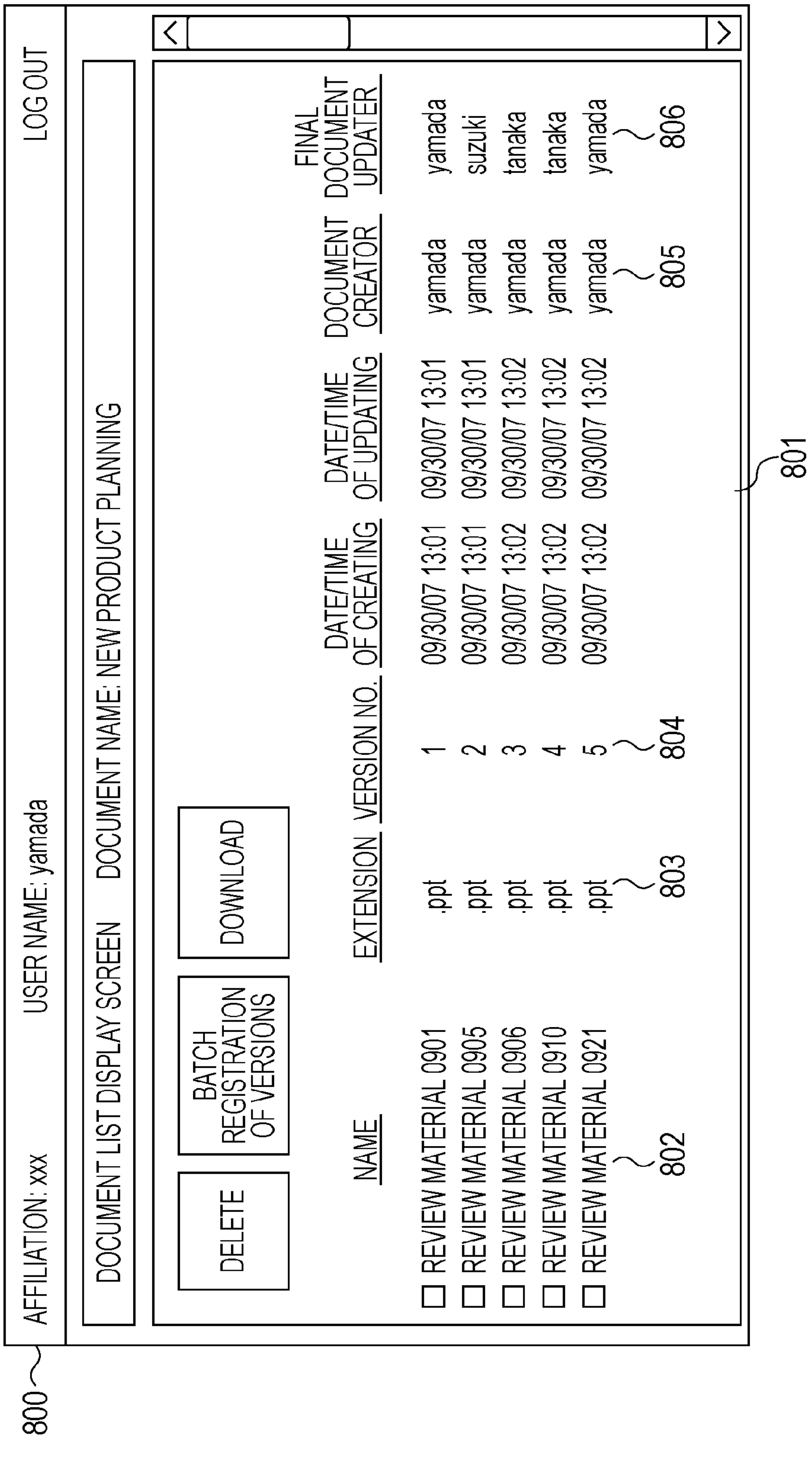
FIG. 8 is a diagram illustrating an example of a version list displaying screen.

FIG. 8 illustrates an example of a version list displaying screen 800. In this example shown in FIG. 8, five files are registered as versions of a single document "Review Material" in response to an operation performed in FIG. 6, and the result of the registration is displayed in the form of a list of files registered as versions of the document "Review Material". In the version list displaying area 801, versions are displayed in the form of a list. Note that "Name" 802 indicates a file name of each individual file, "Extension" 803 indicates an extension of each file, and "Version No." 804 indicates the version number of the file. "Document Creator" 805 indicates a name of a user who issued the request for batch registration of versions. In other words, "Document Creator" 805 indicates a user who has created versions on the document management system 106 (more strictly, a user who issued a command to create versions on the document management system 106. "Final Document Updater" 806 indicates a name of a user who performed final updating. This information is extracted from entities of registered files. If no information is extracted, nothing is displayed in a corresponding field of "Final Document Updater" 806.

Figures 16, 16A:
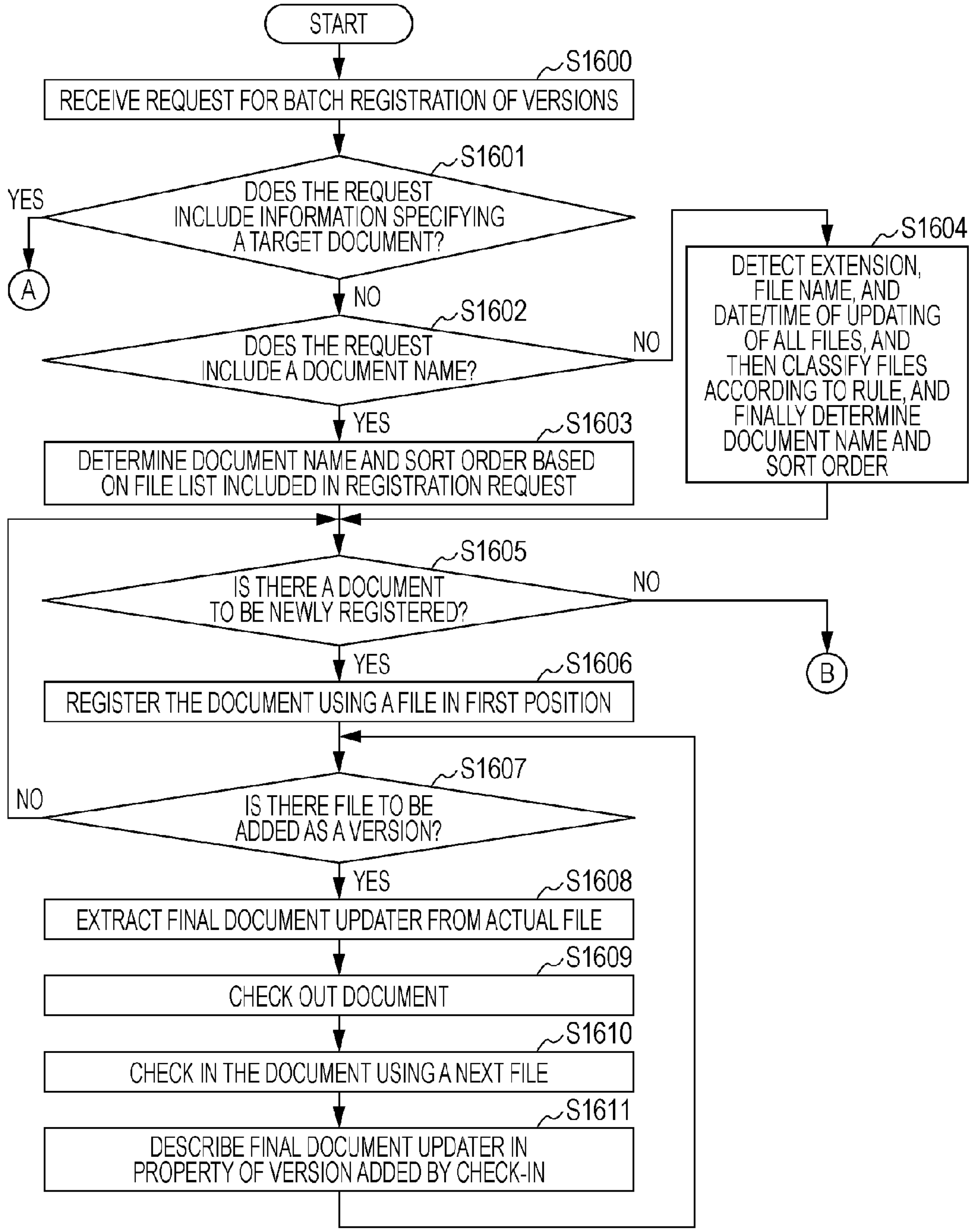
Figure 16B:
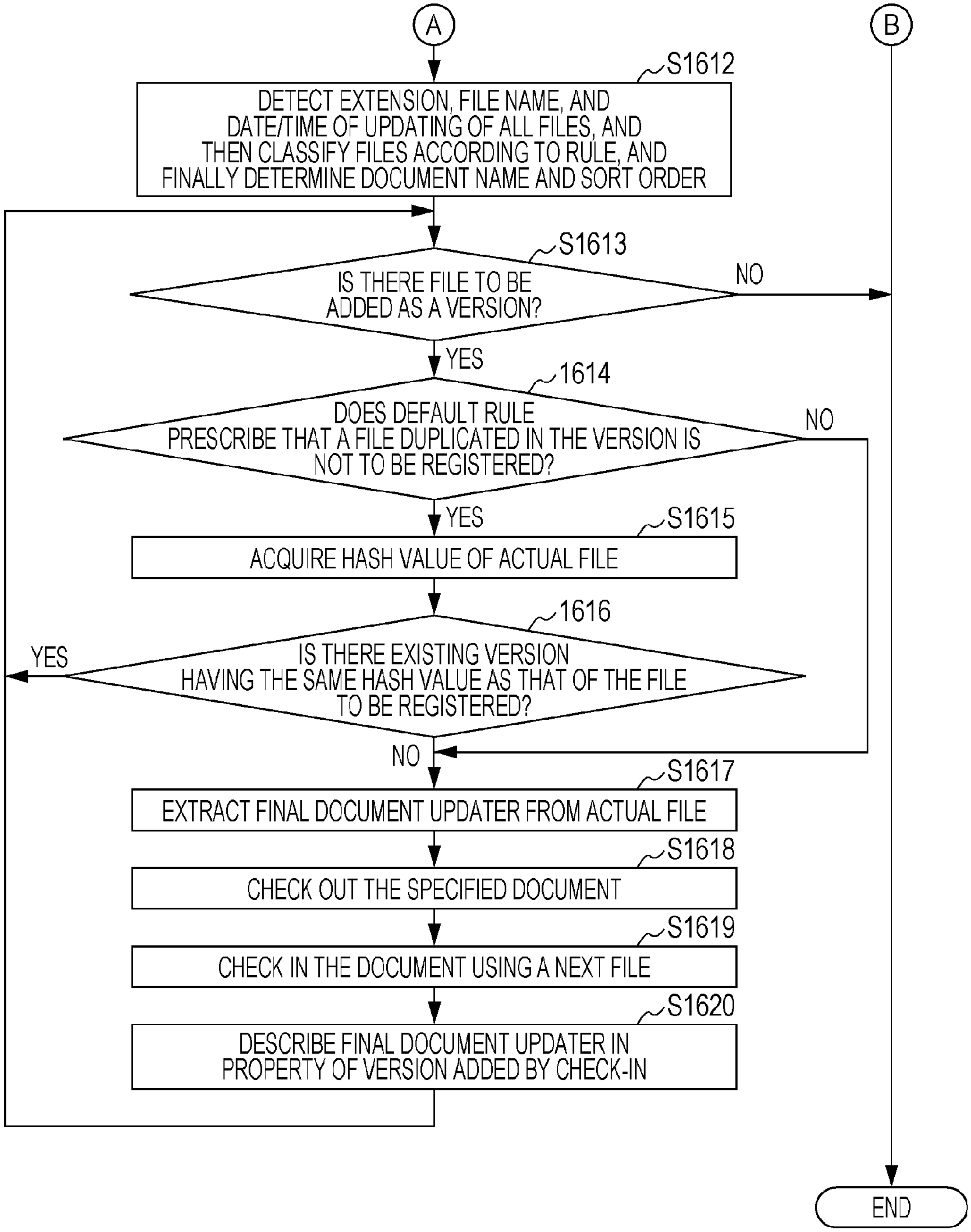

If the document management system 106 receives the request for batch registration of versions from the PC 101, the document management system 106 performs a process associated with the batch registration of versions as will be described later with reference to FIG. 16, and the document management system 106 transmits to the PC 101 a result of the batch registration of versions performed in accordance with the request for batch registration of versions. If the PC 101 receives the result of the batch registration of versions, the PC 101 displays the result in such a manner as shown in FIG. 7 or 8.

An example has been described above as to the procedure of registering a plurality of files as versions of a single document by a user via a Web browser 102 on the PC 101.

Next, an example of a procedure is described below for a case in which "grouping/assigning according to the predetermined rule" is selected in FIG. 6 by a user, and a plurality of files are grouped into a plurality of documents with a plurality of versions.

FIG. 9 illustrates an example of a grouping/assigning rule setting screen for defining a rule of grouping/assigning of documents. The rule is defined differently depending on whether a document is newly registered or is added as a version to an existing document. Reference numeral 901 denotes a grouping/assigning rule setting part for defining a grouping/assigning rule (rule information) in a case where documents are registered as versions of a single document. Reference numeral 902 denotes a sort order setting part for defining a rule of a sort order in which versions are to be registered. A user is allowed to operate the sort order setting part 902 to set the sort order such that files are to be sorted in ascending or descending order by the date/time of updating or by the file name. Reference numeral 903 denotes a document name determination rule setting part for defining a rule of determining a name of a document into which files are grouped. A user is allowed to operate the document name determination rule setting part 903 to select whether the document name is given by a file name of a newest version, by an alphabetic string specified by the grouping/assigning rule, or by the date/time of registering the newest version.

Reference numeral 904 denotes a duplicated file handling setting part for specifying a manner of dealing with duplicated files. This specification is enabled in the case where a plurality of files are registered as versions of an existing document, but this specification is disabled when a document is newly registered. In the above-described document grouping/assigning rule setting screen 900, it is allowed to define the rule of grouping/assigning documents in units of cabinets or folders. Alternatively, the document grouping/assigning rule setting screen 900 may be configured to allow the document grouping/assigning rule to be defined in units of systems. Still alternatively, a plurality of rules may be defined in units of systems, cabinets, or folders, and a rule may be selected when registration is performed, although a further explanation is omitted as to details of the method of managing the plurality of rules and the method of selecting one of the plurality of rules. Reference numeral 905 denotes "EXECUTE" button. If the EXECUTE button is clicked or pressed, the PC 101 executes the grouping/assigning rule set on screen 900.

FIG. 10 illustrates an example of a screen in which a list of files stored in the file storage unit 105 of the PC 101 is displayed. With reference to FIG. 10, an explanation is given below as to grouping/assigning of files according to the predetermined rule applied to five files having a file name starting with "Review Material" and three files having a file name starting with "New Product Planning".

FIG. 11 illustrates an example of a screen 1100 for batch registration of versions. In the example shown in FIG. 11, eight files shown in FIG. 10 are added to a files-to-be-registered list area 1101. In this example, it is specified in the file grouping/assigning method specifying unit 1102 that files are to be grouped according to the predetermined rule. In this state, if a user clicks (or presses) the EXECUTE button, the PC 101 transmits to the document management system 106 a request for batch registration of versions including a list of files including properties of files, a grouping/assigning method, and entities of all files.

Figure 12:
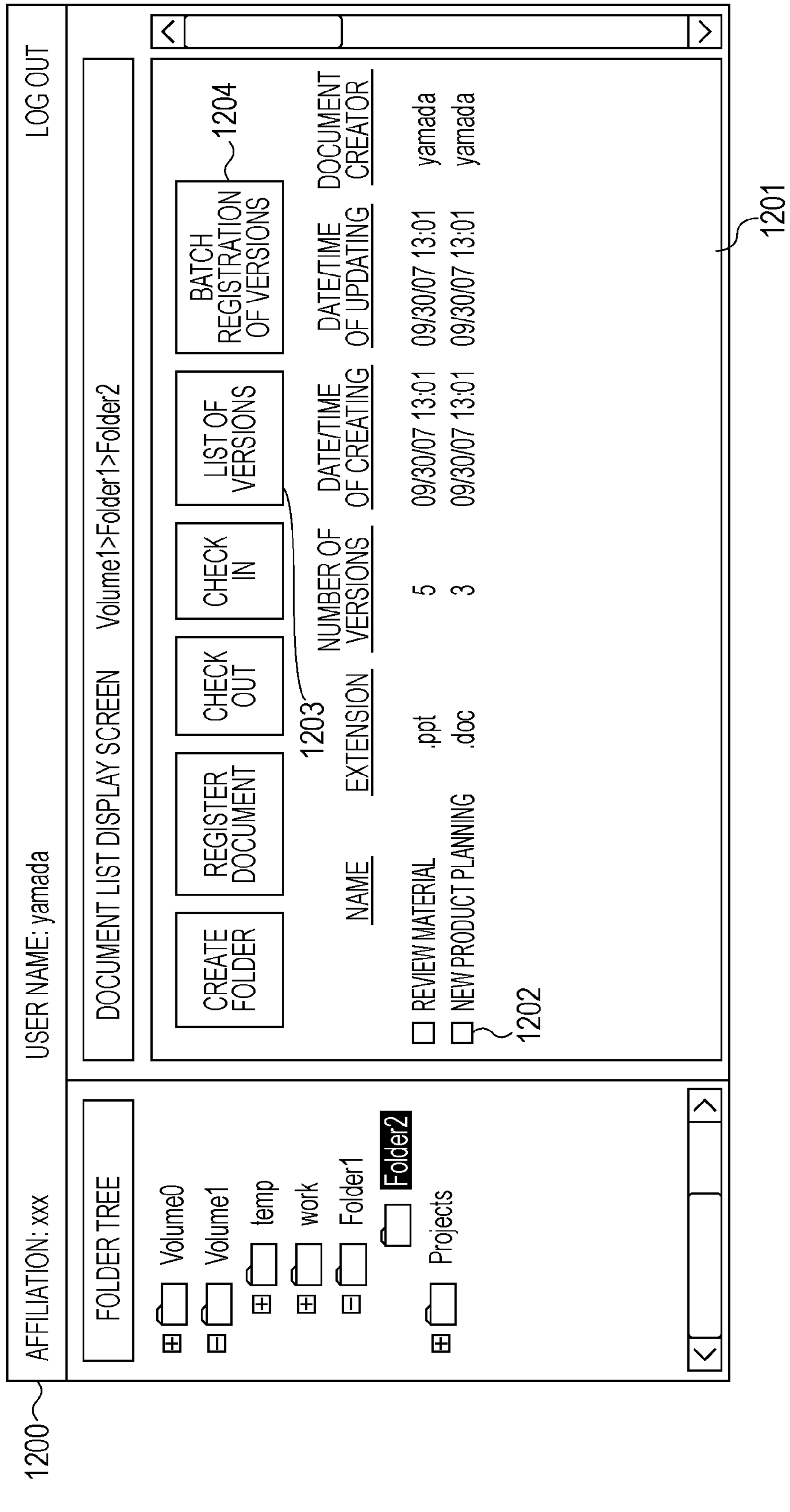
FIG. 12 is a diagram illustrating an example of a document list displaying screen in which displayed is a result of a batch registration of version performed by a document management system in response to clicking on an EXECUTE button in FIG. 11 by a user.

FIG. 12 illustrates an example of a document list displaying screen 1200 in which displayed is a result of batch registration of versions performed by the document management system 106 in response to clicking on the EXECUTE button in FIG. 6 by a user. In this example, it is specified by a user via the grouping/assigning method specifying part 1102 that files are to be grouped according to the predetermined rule, and thus files are grouped according to the rule defined in FIG. 9. According to the rule specified in the grouping/assigning rule setting part 901, files that are the same in extension and in alphabetic string part of file name are registered as versions of a single document, and thus two documents are newly registered. More specifically, according to the rule specified via the document name determination rule setting part 903, alphabetic string parts "Review Material" and "New Product Planning" of file names are employed as document names. As a result, five versions are registered for "Review Material", and three versions are registered for "New Product Planning". In FIG. 12, if a user selects "New Product Planning" by checking a document selection box 1202 and clicks a List of Versions display button 1203, then a version list displaying screen 1300 such as that shown in FIG. 13 is displayed on the PC 101 on the display area 1301.

FIG. 13 illustrates an example of a version list displaying screen. In the example shown in FIG. 13, three files are registered as versions of "New Product Planning" according to the setting made via the screen shown in FIG. 11. Items on the screen shown in FIG. 13 are similar to those shown in FIG. 8. According to the setting in terms of the sort order defined in the sort order setting part 902 in FIG. 9, files are registered in ascending order of date/time of updating, i.e. in order from oldest to newest. As for "Review Material", five versions are registered according to the rule as in the example shown in FIG. 8, although a further explanation thereof is omitted here.

Next, an example of a procedure of adding one or more files as versions of an existing document via a batch registration process is described below. In the example described below, if a file to be added is identical to one of existing versions, the document management system 106 does not make a duplicated addition. That is, in the following explanation, it is assumed that it is specified in the duplicated file handling setting part 904 in FIG. 9 that registration is not performed for any duplicated file.

After a Batch Registration of Version button 1302 in FIG. 13 is clicked by a user or "New Product Planning" is selected by checking a document selection box 1202 in FIG. 12, if a Batch Registration of Version button 1204 is clicked by the user, then the PC 101 displays a screen for batch registration of versions 1400 such as that shown in FIG. 14.

FIG. 14 illustrates an example of a screen for batch registration of versions. In the example shown in FIG. 14, a total of two files shown in FIG. 14 are added to a files list area 1401, i.e., an existing file and a file to be newly registered are displayed in a list of files to be registered. Reference numeral 1402 denotes a document name (e.g., new product planning) as displayed on the display area of display screen 1400. In the mode in which versions are added to an existing document, only the registration according to the predetermined rule is enabled in the file grouping/assigning method specifying unit 1403. That is, in the mode in which files are additionally registered, the rule defined in the duplicated file handling setting part 904 is applied. A rule of grouping a plurality of files into a plurality of existing documents may be defined in advance, and, when a user selects a plurality of files, the document management system 106 may group the selected files into existing documents according to the rule.

If the EXECUTE button in FIG. 14 is clicked, the PC 101 transmits, to the document management system 106, a request for batch registration of versions including a list of files including properties of files, a grouping/assigning method, and entities of all files. The PC 101 may divide the information into a plurality of pieces of data and may sequentially transmit these pieces of data to the document management system 106.

FIG. 15 illustrates an example of a document list displaying screen 1500 on which displayed is a result of batch registration of versions performed in response to clicking on the EXECUTE button in FIG. 14. As can be seen in a version list displaying area 1501 in FIG. 15, "New Product Planning 0914" is a file identical to an existing version, and thus this file is not added as a new version according to the rule that any duplicated file is not to be added. On the other hand, "New Product Planning 0929" is registered as a version No. 4, which is the only file that is additionally registered in this case. Note that as a result of the batch registration of versions performed in response to clicking on the EXECUTE button in FIG. 14 in the mode in which versions are added to existing documents, the number of versions for "New Product Planning" displayed in the document list displaying area 1201 in FIG. 12 is updated to 4 and is displayed in displaying area 1501 in FIG. 15.

Next, a process performed in the document management system is described with reference to a flow chart. FIG. 16 is a flow chart illustrating an example of a process performed by the document management system in response to a command to execute batch registration of versions issued by a user via a screen such as that shown in FIG. 6, FIG. 11 or FIG. 14. If a user clicks on the EXECUTE button on the screen for batch registration of versions, then the Web browser 102 of the PC 101 transmits a request for batch registration of versions to the document management system 106. The request for batch registration of versions includes data that varies depending on the operation performed by the user before the EXECUTE button in the screen for batch registration of versions is clicked.

In step S1600, if the batch registration request receiving unit 107 in the document management system 106 receives the request for batch registration of versions, the batch registration request receiving unit 107 checks the content of the received data.

In step S1601, the batch registration request receiving unit 107 determines whether the received data include an identifier (identification information) identifying an existing document. If the received data does not include an identifier of an existing document, it is determined that a document is to be newly registered, and thus the batch registration request receiving unit 107 advances the processing flow to step S1602. On the other hand, if the received data includes an identifier of an existing document, it is determined that one or more versions are to be added to the existing document, and thus the batch registration request receiving unit 107 advances the processing flow to step S1612.

In step S1602, the batch registration request receiving unit 107 checks the received data to determine whether the received data includes a document name. If the received data includes a document name, it is determined that all received files are to be registered as versions of a single document, and thus the batch registration request receiving unit 107 advances the processing flow to step S1603. On the other hand, in a case where the received data does not include a document name, it is determined that grouping of files into documents and assignment of versions are to be performed according to the predetermined rule, and thus the batch registration request receiving unit 107 advances the processing flow to step S1604.

In step S1603, the batch registration request receiving unit 107 detects information associated with the documents to be registered, properties thereof, and file order from the file list included in the received data, and the batch registration request receiving unit 107 puts the detected information in the RAM 202. Furthermore, the batch registration request receiving unit 107 stores the received files (actual files) in a temporary storage area of the HDD 209.

In step S1605, the document registration unit 108 checks the information put in the RAM 202 to determine whether there is a document to be newly registered. In the case where the processing flow proceeds to step S1605 from S1603, it is determined that there is one document to be registered, and thus the document registration unit 108 advances the processing flow to step S1606.

In step S1606, the document registration unit 108 reads the information associated the document to be newly registered from the RAM 202 and stores the read information in the document/version information storage unit 113. The document registration unit 108 also reads the property of the document (document property information) from the RAM 202 and stores it in the document property storage unit 114.

In step S1607, the version registration unit 110 makes a determination based on the information put in the RAM 202 as to whether there is a file to be added. If there is such a file, the version registration unit 110 advances the processing flow to step S1608, but otherwise the version registration unit 110 returns the processing flow to step S1605. In the present case, the process is in the state in which only the document has been newly registered and nothing other than it has been performed, and thus the version registration unit 110 advances the processing flow to step S1608.

In step S1608, the file property extraction unit 109 reads the file stored in the temporary storage area of the HDD 209 and extracts the final document updater property (final document updater information) of the file. The file property extraction unit 109 puts the extracted information in the RAM 202.

In step S1609, the version registration unit 110 changes the information in the document property storage unit 114 so that the document of interest is temporarily brought into a check-out state.

In step S1610, the version registration unit 110 reads the file stored in the temporary storage area of the HDD 209 and stores it in the document/version information storage unit 113.

The version registration unit 110 changes information in the document property storage unit 114 so that the document of interest is brought back into a check-in state.

In step S1611, the version registration unit 110 reads the property of the file in terms of the final document updater and the like from the RAM 202 and stores it in the version property storage unit 115.

The version registration unit 110 then returns the processing flow to step S1607. The process from step S1608 to S1611 is repeated until the process is completed for all received files. If the process is completed for all files, the document management system 106 returns the processing flow to step S1605. In the present case in which only one document is registered, the total process shown in FIG. 16 is ended when the document management system 106 returns the processing flow to step S1605. As a result of the process described above, for example, the result of the batch registration of versions is transmitted to the PC 101 from the document management system 106. If the PC 101 receives the result of the batch registration of versions, the PC 101 displays the document list displaying screen such as that shown in FIG. 7 and the version list displaying screen such as that shown in FIG. 8 in accordance with the received result of the batch registration of versions.

Next, the processing flow according to the predetermined rule is described below.

In step S1604, the batch registration request receiving unit 107 detects information associated with the document to be registered and property thereof from the file list included in the received data, and the batch registration request receiving unit 107 puts the detected information in the RAM 202. Furthermore, the batch registration request receiving unit 107 stores the received files in the temporary storage area of the HDD 209. The version assigning/grouping unit 111 detects the document/version grouping/assigning rule from the grouping/assigning rule storage unit 116. In accordance with the detected grouping/assigning rule, the version assigning/grouping unit 111 performs a grouping/assigning process based on the information described in the file list put in the RAM 202, and the version assigning/grouping unit 111 writes the result of grouping/assigning in the RAM 202.

The document management system 106 repeats the process from step S1605 to S1611 as many times as there are documents and versions depending on the result of grouping/assigning. In the case where the document registration unit 108 determines in step S1605 that there is no document to be registered, the process shown in FIG. 16 is ended.

As a result of the process described above, for example, the result of the batch registration of versions is transmitted to the PC 101 from the document management system 106. If the PC 101 receives the result of the batch registration of versions, the PC 101 displays the document list displaying screen such as that shown in FIG. 12 and the version list displaying screen such as that shown in FIG. 13 in accordance with the received result of the batch registration of versions.

Next, the processing flow associated with the addition of versions to an existing document is described below.

In step S1612, the batch registration request receiving unit 107 detects the identifier of the existing document and properties of files to be registered from the file list included in the received data, and the batch registration request receiving unit 107 puts the detected information in the RAM 202. Furthermore, the batch registration request receiving unit 107 stores the received files in the temporary storage area of the HDD 209.

The version assigning/grouping unit 111 accesses the grouping/assigning rule storage unit 116 to acquire information indicating the sort order and the rule of handling duplicated files included in the version grouping/assigning rule. In accordance with the acquired information, the version assigning/grouping unit 111 performs sorting based on the file list information put in the RAM 202 and writes the result of the sorting and the information associated with the handling of duplicated files in the RAM 202.

In step S1613, the version registration unit 110 makes a determination based on the information written in the RAM 202 as to whether there is a file to be added. If there is such a file, the version registration unit 110 advances the processing flow to step S1614, but otherwise the version registration unit 110 ends the process shown in FIG. 16. In the present case, the version registration unit 110 advances the processing flow to step S1614.

In step S1614, the version registration unit 110 reads the information associated with the handling of duplicated files from the RAM 202 and determines whether it is not necessary to register duplicated files in versions. If the prescribed rule indicates that duplicates files are also to be registered, the version registration unit 110 advances the processing flow to step S1617 but otherwise the version registration unit 110 advances the processing flow to step S1615. In the present case, the rule indicates that duplicated files are not to be registered, the version registration unit 110 advances the processing flow to step S1615.

In step S1615, the file property extraction unit 109 reads a file to be registered from the temporary storage area of the HDD 209 and calculates a hash value of the file. The calculation of the hash value may be performed using a known technique. In a most widely used calculation technique, the hash value is expressed in a 32 digit hexadecimal number. The file property extraction unit 109 writes the calculated hash value in the RAM 202.

In step S1616, the version registration unit 110 acquires hash values of all versions belonging to the document of interest from the version property storage unit 115 and determines whether there is a version having the same hash value as that of the file to be added. If there is such a version, the version registration unit 110 returns the processing flow to step S1613 without adding the present file as a new version. If no version having the same hash value as that of the present file is detected, the version registration unit 110 advances the processing flow to step S1617.

Steps S1617 to S1620 are similar to step S1608 to S1611, and thus a duplicated explanation thereof is omitted.

As a result of the process described above, for example, the result of the batch registration of versions is transmitted to the PC 101 from the document management system 106. If the PC 101 receives the result of the batch registration of versions, the PC 101 displays the document list displaying screen such as that shown in FIG. 15 in accordance with the received result of the batch registration of versions. Thus, when the batch registration of versions specified in FIG. 14 is executed, one file is added while the other one is not added.

FIGS. 17 and 18 illustrate examples of document property data and version property data. The data shown in FIG. 17 corresponds to the data of the document displayed in the document list displaying screen shown in FIG. 7, and the data shown in FIG. 18 corresponds to the data of version No. 1 to No. 3 displayed in the version list displaying screen shown in FIG. 8. The document data and the version data (version information) are correlated to each other using document identifiers as keys. The version data includes information indicating a version number, an extension, a file size, a hash value of a file, etc. Note that the version data may be configured in a different manner as long as the embodiment can be realized.

As described above, the embodiment of the present invention makes it possible to perform batch registration in such a manner that a plurality of files on a file system having no capability of managing versions are registered as a group of a single document, and it also becomes possible to identify a final updater of each version. Furthermore, it becomes possible to control registration such that when a document includes a file identical to a file of interest, further addition of the file of interest to the group of the document is not performed.

The purpose of the present invention can also be realized by executing the following process. That is, a process in which a recording medium, in which a program code of a software that realizes the functions of the above-described embodiments is recorded, is supplied to the system or apparatus, and then a computer of the system or apparatus (such as CPU or MPU) reads out the program code stored in the recording medium. In such a case, the program code read out from the recording medium itself realizes the functions of the above-described embodiments, and the recording medium where the program code is stored as well as the program code are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-182045 filed Jul. 11, 2008, which is hereby incorporated by reference herein in its entirety.

What is claimed is:

1. A system that registers a plurality of files with a single name, the system comprising a processor and a memory containing instructions that, when executed by the processor, cause the processor to perform operations comprising:
- determining an arrangement order of a plurality of files which are registration targets;
- determining a single name for the plurality of files;
- allotting a version name individually to each of the plurality of files according to the determined arrangement order; and
- registering the plurality of files, the determined single name, and the allotted version names,
- wherein a version name allotted to each file is different from each of the other files.

2. The system according to claim 1, further comprising registering each of the plurality of files as a file which has the determined single name and the version name individually allotted for the file among the plurality of files having the single name.

3. The system according to claim 1, further comprising determining the single name in response to a name input by a user.

4. The system according to claim 1, further comprising determining an arrangement order of the plurality of files according to an update date and time of each of the plurality of files.

5. The system according to claim 1, further comprising determining an arrangement order of the plurality of files according to a file name of each of the plurality of files.

6. The system according to claim 1, further comprising determining an arrangement order of the plurality of files according to an instruction for an arrangement order given by a user.

7. The system according to claim 1, further comprising:
- determining whether to register a plurality of files by allotting a single name the files or register a plurality of files by allotting an individual name to each of the files; and
- determining to register a plurality of files by allotting a single name in a case where the plurality of files has a same extension, and determining to register a plurality of files by allotting an individual name to each of the files in a case where the plurality of files does not have the same extension.

8. The system according to claim 1, further comprising:
- determining whether to register a plurality of files by allotting a single name to the files or register a plurality of files by allotting an individual name to each of the files; and
- determining to register a plurality of files by allotting a single name in a case where first plural characters of a file name of the plurality of files are same, and determining to register a plurality of files by allotting an individual name to each of the files in a case where first plural characters of a file name of the plurality of files are not the same.

9. A method comprising:
- determining an arrangement order of a plurality of files which are registration targets;
- determining a single name for the plurality of files;
- allotting a version name individually to each of the plurality of files according to the determined arrangement order; and
- registering the plurality of files, the determined single name, and the allotted version names,
- wherein a version name allotted to each file is different from each of the other files.

10. The method according to claim 9, further comprising registering each of the plurality of files as a file which has the determined single name and the version name individually allotted for the file among the plurality of files having the single name.

11. The method according to claim 9, wherein the determining the single name is in response to a name input by a user.

12. The method according to claim 9, further comprising determining an arrangement order of the plurality of files according to an update date and time of each of the plurality of files.

13. The method according to claim 9, further comprising determining an arrangement order of the plurality of files according to a file name of each of the plurality of files.

14. The method according to claim 9, further comprising determining an arrangement order of the plurality of files according to an instruction for an arrangement order given by a user.

15. The method according to claim 9, further comprising:
- determining whether to register a plurality of files by allotting a single name the files or register a plurality of files by allotting an individual name to each of the files;
- determining to register a plurality of files by allotting a single name in a case where the plurality of files has a same extension; and
- determining to register a plurality of files by allotting an individual name to each of the files in a case where the plurality of files does not have the same extension.

16. The method according to claim 9, further comprising:
- determining whether to register a plurality of files by allotting a single name to the files or register a plurality of files by allotting an individual name to each of the files;
- determining to register a plurality of files by allotting a single name in a case where first plural characters of a file name of the plurality of files are same; and
- determining to register a plurality of files by allotting an individual name to each of the files in a case where first plural characters of a file name of the plurality of files are not the same.

17. A computer readable storage medium storing a computer-executable program of instructions for causing a computer to perform a method comprising:
- determining an arrangement order of a plurality of files which are registration targets;
- determining a single name for the plurality of files;
- allotting a version name individually to each of the plurality of files according to the determined arrangement order; and
- registering the plurality of files, the determined single name, and the allotted version names,
- wherein a version name allotted to each file is different from each of the other files.

18. The computer readable storage medium according to claim 17, further comprising registering each of the plurality of files as a file which has the determined single name and the version name individually allotted for the file among the plurality of files having the single name.

19. The computer readable storage medium according to claim 17, wherein the determining the single name is in response to a name input by a user.

20. The computer readable storage medium according to claim 17, further comprising determining an arrangement order of the plurality of files according to an update date and time of each of the plurality of files.

* * * * *